United States Patent
Bishop et al.

(10) Patent No.: US 10,198,298 B2
(45) Date of Patent: Feb. 5, 2019

(54) HANDLING MULTIPLE TASK SEQUENCES IN A STREAM PROCESSING FRAMEWORK

(71) Applicant: salesforce.com, inc., San Francisco, CA (US)

(72) Inventors: Elden Gregory Bishop, San Francisco, CA (US); Jeffrey Chao, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 45 days.

(21) Appl. No.: 14/986,351

(22) Filed: Dec. 31, 2015

(65) Prior Publication Data
US 2017/0075693 A1    Mar. 16, 2017

Related U.S. Application Data

(60) Provisional application No. 62/219,127, filed on Sep. 16, 2015.

(51) Int. Cl.
*G06F 9/38* (2018.01)
*G06F 9/50* (2006.01)
*G06F 9/48* (2006.01)

(52) U.S. Cl.
CPC .......... *G06F 9/5088* (2013.01); *G06F 9/4881* (2013.01); *G06F 2209/483* (2013.01)

(58) Field of Classification Search
None
See application file for complete search history.

(56) References Cited

U.S. PATENT DOCUMENTS 5,860,017 A * 1/1999 Sharangpani ......... G06F 9/3804
                                                               712/218
9,195,493 B2 * 11/2015 Busaba ............... G06F 9/45558
(Continued)

FOREIGN PATENT DOCUMENTS

WO    WO-2009101563 A1 *  8/2009  ........... G06F 9/4881

OTHER PUBLICATIONS

Sasaki et al, Scalability-Based Manycore Partitioning, 2012, ACM, PACT'12, pp. 107-116.*
(Continued)

*Primary Examiner* — Abu Ghaffari
(74) *Attorney, Agent, or Firm* — Sterne, Kessler, Goldstein & Fox P.L.L.C.

(57) ABSTRACT

The technology disclosed improves existing streaming processing systems by allowing the ability to both scale up and scale down resources within an infrastructure of a stream processing system. In particular, the technology disclosed relates to a dispatch system for a stream processing system that adapts its behavior according to a computational capacity of the system based on a run-time evaluation. The technical solution includes, during run-time execution of a pipeline, comparing a count of available physical threads against a set number of logically parallel threads. When a count of available physical threads equals or exceeds the number of logically parallel threads, the solution includes concurrently processing the batches at the physical threads. Further, when there are fewer available physical threads than the number of logically parallel threads, the solution includes multiplexing the batches sequentially over the available physical threads.

17 Claims, 10 Drawing Sheets

(56) References Cited

U.S. PATENT DOCUMENTS

| | | | |
|---|---|---|---|
| 9,569,221 B1* | 2/2017 | Chaudhri | G06F 9/3851 |
| 9,674,249 B1 | 6/2017 | Kekre et al. | |
| 9,680,893 B2 | 6/2017 | Banerjee et al. | |
| 9,715,411 B2* | 7/2017 | Doing | G06F 9/5027 |
| 2003/0149717 A1 | 8/2003 | Heinzman | |
| 2004/0215858 A1* | 10/2004 | Armstrong | G06F 9/52 710/200 |
| 2005/0108414 A1* | 5/2005 | Taylor | H04L 29/06027 709/231 |
| 2007/0088970 A1 | 4/2007 | Buxton et al. | |
| 2007/0214381 A1 | 9/2007 | Goyal et al. | |
| 2008/0184253 A1* | 7/2008 | Kashyap | G06F 9/5077 718/104 |
| 2009/0049451 A1* | 2/2009 | Bates | G06F 9/461 718/108 |
| 2009/0064207 A1* | 3/2009 | Sigal | G06F 9/544 719/330 |
| 2009/0171999 A1* | 7/2009 | McColl | G06F 17/30539 |
| 2010/0077403 A1* | 3/2010 | Yang | G06F 9/4881 718/104 |
| 2010/0153687 A1 | 6/2010 | Koda et al. | |
| 2010/0229178 A1* | 9/2010 | Ito | G06F 9/5083 718/104 |
| 2010/0293535 A1* | 11/2010 | Andrade | G06F 8/44 717/156 |
| 2011/0138393 A1* | 6/2011 | Venkumahanti | G01R 1/07378 718/104 |
| 2012/0137018 A1 | 5/2012 | Uhlig et al. | |
| 2012/0278811 A1* | 11/2012 | Baynast | G06F 9/5027 718/104 |
| 2013/0007753 A1* | 1/2013 | Jain | G06F 9/46 718/103 |
| 2013/0031550 A1 | 1/2013 | Choudhury et al. | |
| 2013/0111489 A1* | 5/2013 | Glew | G06F 9/4881 718/103 |
| 2013/0117270 A1 | 5/2013 | Sullivan et al. | |
| 2013/0254771 A1* | 9/2013 | Musayev | G06F 9/4843 718/101 |
| 2013/0290367 A1 | 10/2013 | Kashiyama | |
| 2013/0326058 A1* | 12/2013 | Brady | H04L 43/0888 709/224 |
| 2014/0019729 A1* | 1/2014 | Pell | G06F 15/8053 712/225 |
| 2014/0208331 A1* | 7/2014 | Li | G06F 9/5044 718/105 |
| 2014/0237477 A1* | 8/2014 | Cadambi | G06F 9/5044 718/103 |
| 2014/0259024 A1* | 9/2014 | Sridharan | G06F 9/485 718/106 |
| 2014/0304545 A1 | 10/2014 | Chen et al. | |
| 2014/0317448 A1 | 10/2014 | Rash et al. | |
| 2015/0128144 A1 | 5/2015 | Mansell | |
| 2015/0169341 A1 | 6/2015 | Gulati et al. | |
| 2015/0319207 A1* | 11/2015 | Werr | H04L 67/06 709/219 |
| 2015/0339158 A1 | 11/2015 | Harris et al. | |
| 2015/0358425 A1* | 12/2015 | Vennelakanti | G01V 1/28 709/226 |
| 2015/0378941 A1* | 12/2015 | Rozas | G06F 13/24 710/267 |
| 2016/0062785 A1 | 3/2016 | Kumeta et al. | |
| 2016/0139946 A1 | 5/2016 | Gardner et al. | |
| 2016/0219089 A1 | 7/2016 | Murthy et al. | |
| 2016/0269247 A1 | 9/2016 | Chakradhar et al. | |

OTHER PUBLICATIONS

Shen et al, CloudScale: Elastic Resource Scaling for Multi-Tenant Cloud Systems, 2011, ACM, SOCC'11, pp. 1-14.*
U.S. Appl. No. 15/004,887—Office Action dated Jul. 12, 2017, 27 pages.
U.S. Appl. No. 14/986,401—Office Action dated Jun. 16, 2017, 38 pages.
Boykin, et al., "Summingbird: A Framework for Integrating Batch and Online MapReduce Computations," Twitter, Inc., Proceedings of the VLDB Endowment, vol. 7, No. 13, (2014) pp. 1441-1451.
Haltian Ltd., "Thingsee Engine API", Ver 01.00, Mar. 7, 2015, 24 pages.
U.S. Appl. No. 14/986,419—Notice of Allowance dated Aug. 9, 2017, 38 pages.
U.S. Appl. No. 14/986,401—Response to Office Action dated Jun. 16, 2017 filed Sep. 18, 2017, 9 pages.
U.S. Appl. No. 14/986,401—Notice of Allowance dated Oct. 6, 2017, 9 pages.
U.S. Appl. No. 15/004,887—Response to Office Action dated Jul. 12, 2017 filed Oct. 12, 2017, 10 pages.
U.S. Appl. No. 15/004,887—Notice of Allowance dated Dec. 7, 2017, 5 pages.
U.S. Appl. No. 14/986,401—Notice of Allowance dated Jan. 3, 2018, 11 pages.
U.S. Appl. No. 14/986,365—Office Action dated Jan. 26, 2018, 41 pages.
Takano et al., "A Distributed Application Execution System for an Infrastructure with Dynamically Configured Networks", (2012). IEEE., pp. 675-681, Retrieved from the Internet researchgate.net/profile/Ryousei_Takano/publication/233823353_A_Distributed_Application_Execution_System_for_an_Infr>.
Kounev et al., "Autonomic QoS-Aware Resource Management in Grid Computing using Online Performance Models", (2007). ICST., pp. 1-10. Retrieved from the Internet //ai2-s2-pdfs.s3.amazonaws.com/1478/465b19e2648c4efeb10311317 c0426acc095.pdf>.
Park et al., "Flow: A Stream Processing System Simulator", (2010). IEEE., pp. 1-9, Retrieved from the Internet delivery.acm.org/10.1145/2020000/2015815/054 71658.pdf?ip=151.207 .250.41 &id=2015815&acc=ACTIVE%20SERVICE&key=C15944E53D0ACA63%2E4D4702B0C3E38B35%2E4D4702B0C3E38B35%2E4D4702B0C3E38B35&CFID>.

* cited by examiner

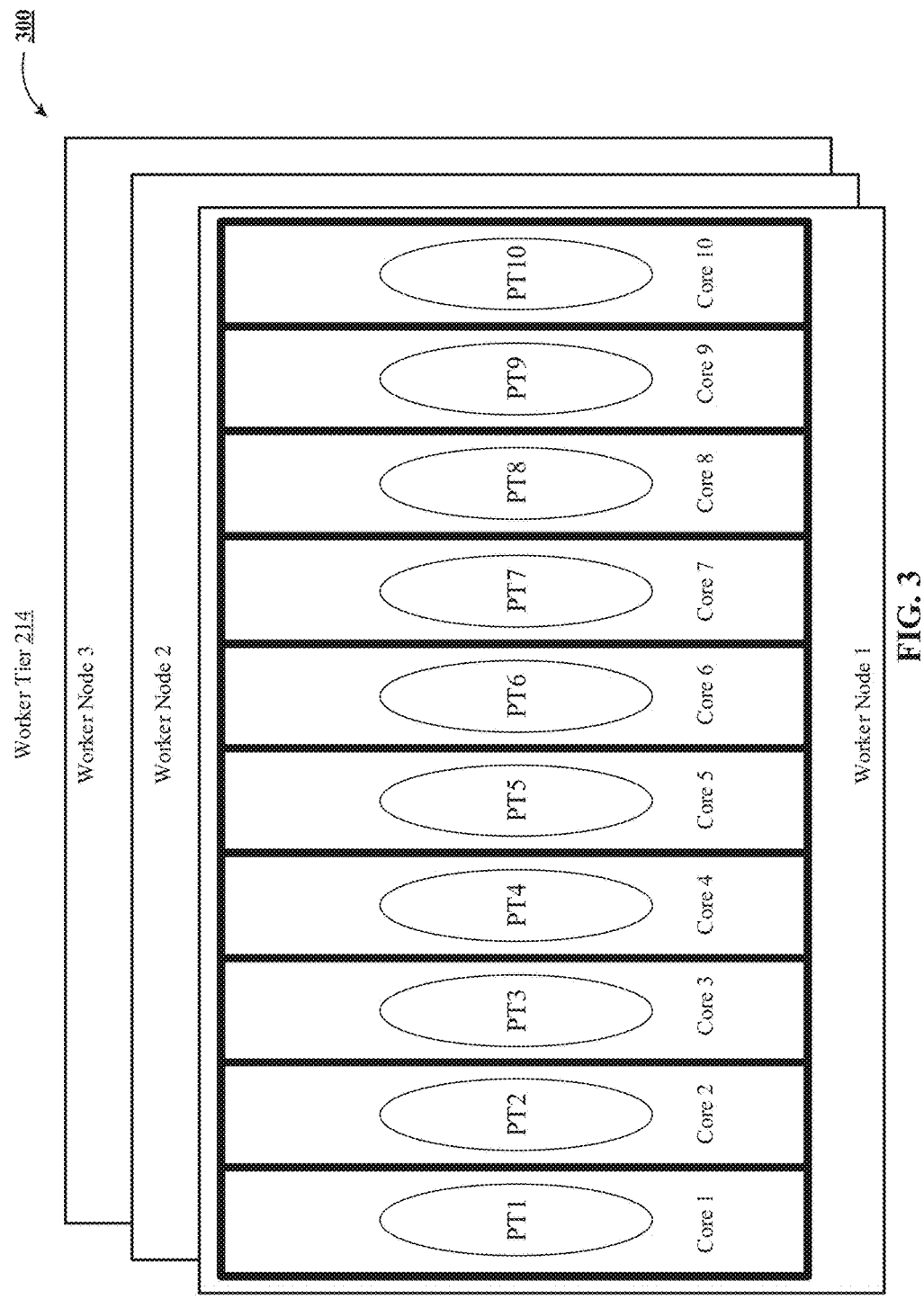

HANDLING MULTIPLE TASK SEQUENCES IN A STREAM PROCESSING FRAMEWORK

PRIORITY APPLICATION

This application is related to and claims the benefit of U.S. Provisional Patent Application 62/219,127, "HANDLING MULTIPLE TASK SEQUENCES IN A STREAM PROCESSING FRAMEWORK", filed on Sep. 16, 2015. The priority provisional application is hereby incorporated by reference for all purposes.

RELATED APPLICATIONS

This application is related to U.S. patent application Ser. No. 14/936,141, entitled "SIMPLIFIED ENTITY LIFE-CYCLE MANAGEMENT" filed on Nov. 9, 2015. The related application is hereby incorporated by reference for all purposes.

This application is related to U.S. patent application Ser. No. 14/931,658, entitled "SIMPLIFIED ENTITY ENGAGEMENT AUTOMATION" filed on Nov. 3, 2015. The related application is hereby incorporated by reference for all purposes.

This application is related to U.S. Patent Application No. 14/986,365, "PROVIDING STRONG ORDERING IN MULTI-STAGE STREAMING PROCESSING," filed on Dec. 31, 2015. The related application is hereby incorporated by reference for all purposes.

FIELD OF THE TECHNOLOGY DISCLOSED

The technology disclosed relates generally to a processing framework for stream processing systems, and in particular to providing an improved stream processing framework that uses a combination of concurrent and multiplexed processing.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

The technology disclosed improves existing streaming processing systems by providing the ability to both scale up and scale down resources within an infrastructure of a stream processing system. In particular, the technology disclosed relates to a dispatch process for a stream processing system that adapts its behavior according to a computational capacity of the system based on a run-time evaluation. The technical solution includes, during run-time execution of a pipeline, comparing a count of available physical threads against a set number of logically parallel threads; and when a count of available physical threads equals or exceeds the number of logically parallel threads, concurrently processing the batches at the physical threads. Further, when there are fewer available physical threads than the number of logically parallel threads, the solution includes multiplexing the batches sequentially over the available physical threads.

In today's world, we are dealing with huge data volumes, popularly referred to as "Big Data". Web applications that serve and manage millions of Internet users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism.

Stream processing is quickly becoming a crucial component of Big Data processing solutions for enterprises, with many popular open-source stream processing systems available today, including Apache Storm™, Apache Spark™, Apache Samza™ Apache Flink™, and others. Many of these stream processing solutions offer default schedulers that evenly distribute processing tasks between the available computation resources using a round-robin strategy. However, such a strategy is not cost effective because substantial computation time and resources are lost during assignment and re-assignment of tasks to the correct sequence of computation resources in the stream processing system, thereby introducing significant latency in the system.

Therefore, an opportunity arises to provide systems and methods that use a combination of concurrent and multiplexed processing schemes to adapt to the varying computational requirements and availability in a stream processing system with little performance loss or added complexity. Increased revenue, higher user retention, improved user engagement and experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The technology disclosed improves existing streaming processing systems by allowing the ability to both scale up and scale down resources within an infrastructure of a stream processing system. In particular, the technology disclosed relates to a dispatch system for a stream processing system that adapts its behavior according to a computational capacity of the system based on a run-time evaluation. The technical solution includes, during run-time execution of a pipeline, comparing a count of available physical threads against a set number of logically parallel threads; and when a count of available physical threads equals or exceeds the number of logically parallel threads, concurrently processing the batches at the physical threads. Further, when there are fewer available physical threads than the number of logically parallel threads, the solutions includes multiplexing the batches sequentially over the available physical threads.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3 is one implementation of a worker node in a worker tier that includes a plurality of physical threads utilizing a whole processor core of the worker node.

DETAILED DESCRIPTION

Figure 1:
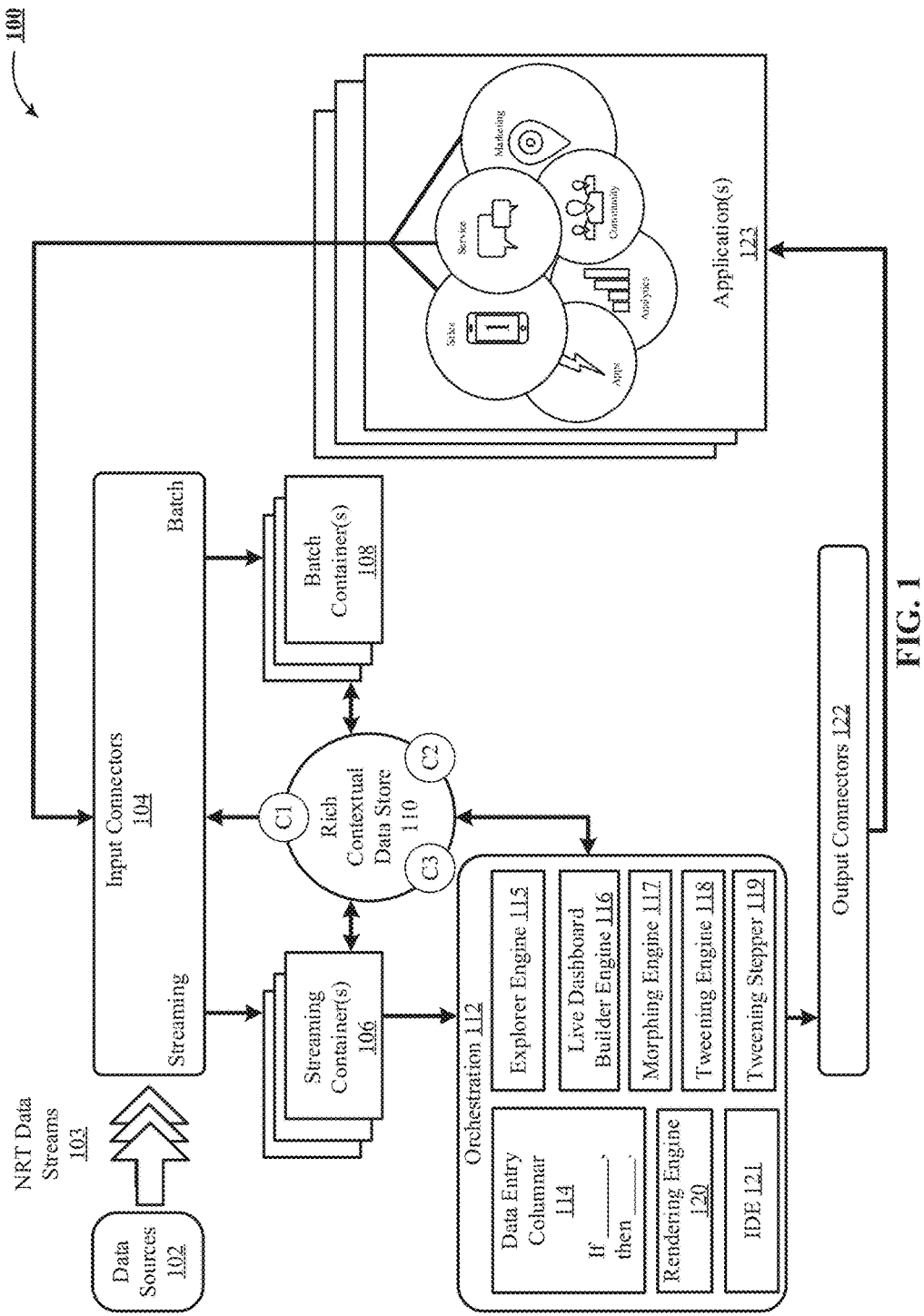
FIG. 1 depicts an exemplary IoT platform.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an explanation of terminology that will be used throughout the discussion is provided, followed by an introduction describing some of the technical problems addressed and technical solutions offered by various implementations. Then, a high-level description of some implementations will be discussed at an architectural level. Also, a state machine implementing an entity management workflow is described. Further, some user interface views used by some implementations will be presented. Next, more focused actions for implementing the system, together with data entry models, transitive triggers and condition definitions are discussed. Lastly, some particular implementations are discussed.

Terminology

Task Sequence: A "task sequence" is defined as a designed effort or process, usually implemented by an experience operator (e.g. company, organization), to enable effective user management and resource provisioning, application life cycle management, workflow implementation, user engagement, traffic monitoring, activity tracking, provisioning for application modeling, etc. A task sequence involves collection of data from a large number of entities and subsequent processing of the collected data. Data for task sequences is received as continuous near real-time (NRT) data streams, which are processed to generate real-time analytics. In one illustrative example, a task sequence is a ride delivery workflow set up by a cab sharing company like Uber™. The ride delivery workflow can involve multiple stages, such as (1) receiving a cab request from an end-user, (2) identifying the requested destination area, (3) discovering available Uber cab drivers in the destination area, (4) transmitting the cab request with contact information of the end-user to the available Uber cab drivers, (5) receiving ratification from at least one willing Uber cab driver, (6) notifying the end-user of the imminent cab arrival with cab vehicle information and (7) receiving confirmation from the end-user regarding accepting the cab delivery. Each of these seven stages involves exchange of a substantial amount of data, which gets processed in real-time to generate real-time analytics. An augmentation of millions of such real-time user-requests and real-time responses applied over extended periods of time is defined as a task sequence. Other examples of a task sequence could be—receiving millions of e-mails every day for an entity operator like Microsoft™ and processing them in real-time to generate click metrics that identify which users clicked on certain web links included in the e-mails, receiving millions of requests from users of Uber™ to redeem ride discount coupons distributed by Uber™ and receiving millions of tweets about a music concert. This application interchangeably refers to a "task sequence" as an "entity experience operation", and vice-versa.

Long Tail Task Sequence: A "long tail task sequence" is a task sequence that consumes dedicated computing resources which, when properly sized for the beginning of the task sequence, are excessive as the task sequence tails off. An example of a long tail task sequence is the giving of fantasy football game tokens during a Super Bowl by a gaming company. Once the demand for fantasy football tapers after the Super Bowl, the use of the game tokens decreases. As a result, the number of game token redemption request events electronically received also decreases. However, the gaming company continues to honor the unused tokens that are redeemed slowly over a long period after the Super Bowl. This extended lull can be characterized by a long tail task sequence because it does not require as many computation resources as does the surge during the Super Bowl and thus token handling can be completed using fewer computational resources than initially allotted.

Container: A stream processing framework is built using an API (application programming interface) and deployed as a cluster called a "container". The container takes care of the distribution of tasks/jobs within a given infrastructure and the API is designed to handle message passing, task/job discovery and fault-tolerance. This application interchangeably refers to a "container" as a "stream container", and vice-versa. This application also interchangeably refers to a "container" or a collection of containers as a "grid", and vice-versa.

Worker Node: A container groups a set of physical machines called "worker nodes".

Physical Thread: Once deployed, a container operates over of a set of so-called "physical threads". A physical thread utilizes a processor core of a worker node and runs inside a set of code processes (e.g., Java processes) that are distributed over the worker node, no more than one physical thread per core. A physical thread also carries out the logic of a set of tasks/jobs for different elements and components (e.g., emitters and transformers) of a container.

Emitter: Data enters a container through a so-called "emitter". Emitters are event tuple sources for a container and are responsible for getting the event tuples into the container. In one implementation, emitters pull event tuples from input queues. In some implementations, emitters include user-specified conversion functions, such that they consume byte strings from an input queue and forward them as tuples to downstream transformers. An emitter retrieves one or more tasks/jobs to be executed by one or more physical threads of a worker node.

Transformers: A transformer is a computation unit of a container that processes the incoming event tuples in the container and passes them to the next set of transformers downstream in the container. A transformer passes one or more tasks/jobs downstream, typically to be further transformed one or more physical threads of a worker node.

Pipeline: A pipeline is defined as a series of grouped event tuples from one or more NRT data streams. In one implementation, the grouping is on tuple-by-type basis. In another implementation, the grouping is on batch-by-batch basis. In some implementations, each pipeline is identified by a unique pipeline identifier (ID). In one implementation, multiple NRT data streams can source data to one or more pipelines. In another implementation, multiple pipelines can source event tuples to one or more containers. In yet another implementation, a NRT data stream for a task sequence is assigned to a single pipeline, which in turn is processed over a single container. This application interchangeably refers to a "pipeline" as an "input pipeline" and vice-versa.

Batch: A batch is defined as an assemblage of event tuples partitioned on a time-slice basis and/or a batch-size basis and sequentially queued in a pipeline. A time-slice based definition includes partitioning at least one incoming NRT data stream by its most recently received portion within a time window (e.g., one batch keeps the event tuples from the last one second). A batch-size based definition includes partitioning at least one incoming NRT data stream by a most recently received portion limited or restricted to or constrained by a data size (e.g., one batch includes 10 MB of most recently received event tuples). In other implementations, a combination of time-size basis and batch-size basis is used to define batches. In some other implementations, each batch in a pipeline is identified by a unique batch identifier (ID).

Batch-Unit: A micro unit of work of a batch is called a batch-unit. A batch is subdivided into a set of batch units. In some implementations, different batch-units of a batch are processed in different stages at different computation units of a container, a concept referred to as "multi-stage processing". In some other implementations, a batch is a transactional boundary of stream processing within a container, such a transaction is considered to be complete when a batch is completely processed and is considered incomplete when a batch overruns a time-out without all of its batch-units being processed.

Coordinator: The coordination between a pipeline that includes data to be processed and the worker nodes that process the data is carried out through a software component of the container called a "coordinator", which is in charge of distribution of tasks to the physical threads in a worker node. This application interchangeably refers to a "coordinator" as a "grid-coordinator", and vice-versa.

Scheduler: A scheduler tracks one or more pipelines in a container and communicates with the coordinator to schedule execution of batches in the container. In some implementations, a scheduler maintains the current batch stage information during multi-stage processing of a batch and communicates this information along with identification of the batch and pipeline to the coordinator. This application interchangeably refers to a "scheduler" as a "grid-scheduler", and vice-versa.

Parallelism: A container runs a user-specified number of logically parallel threads, fixed by a developer of a container. A "logically parallel threads" value specifies how many threads are to be simultaneously utilized by the container during processing of batches in a pipeline.

Near Real-Time Data Stream: A near real-time (NRT) data stream is defined as an unbounded sequence of event tuples that is processed in parallel and distributed among multiple worker nodes. In one implementation, a NRT data stream is defined as a collection of real-time events for a task sequence or a particular stage of a task sequence. In another implementation, a NRT data stream is defined as a collection of events that are registered as they are generated by an entity. In one implementation, a NRT data stream is an unbounded sequence of data tuples. In some implementations, a NRT data stream has an emission rate of one million events or tuples per second.

Stream Processing Framework: A "stream processing framework" is defined as a real-time stream processing system that represents an entire streaming application as a graph of computation. In some implementations, the stream processing framework processes NRT data streams for one or more task sequences to generate real-time analytics. This application interchangeably refers to a "stream processing framework" as a "stream processing system", and vice-versa.

Internet of Things Platform: The "Internet of Things (IoT) platform" disclosed herein is defined as an integrated environment that collects and processes a high volume of data from a plurality of entities in real-time or near real-time, often with low latency. In some instances, processing logic can be applied to the data to generate real-time or near real-time analytics. In one implementation, an IoT platform is defined as an integrated framework that utilizes computation over a combination of stream mode and batch mode to periodically generate aggregates using batch and offline analytics and substitute results from real-time data streams to generate real-time analytics by performing computational tasks like data mining, machine learning, statistical processing, predictive analytics, time series analysis, rule based processing, complex event processing, pattern detection, correlation and more. In one implementation, the IoT platform offers a high throughput of the order of processing one million tuples per second per node. In another implementation, the IoT platform offers insights to end-users in the form of rich visualization, using GUI and/or API based tools like standard graphs, bars, charts and overlaid infographics.

Event: An event is any identifiable unit of data that conveys information about an occurrence. In one implementation, an event can also provide information concerning an entity. An event can have three aspects: a timestamp indicating when the event occurred; a set of dimensions indicating various attributes about the event; and a set of metrics related to the event. Events can be user-generated events such as keystrokes and mouse clicks, among a wide variety of other possibilities. System-generated events include statistics (e.g. latency/number of bytes, etc.), program loading and errors, also among a wide variety of other possibilities. In one implementation, events include network flow variables, device information, user and group information, information on an application (e.g., resource condition, variables and custom triggered events). An event typically represents some message, token, count, pattern, value, or marker that can be recognized within a NRT data stream, such as network traffic, specific error conditions or signals, thresholds crossed, counts accumulated, and so on. A typical user interaction with an application like Pardot™ processes a sequence of events that occur in the context of a session. The main events of note are (a) login—provide user credentials to a hosted service to authenticate the user; (b) application transactions—execute a set of application level transactions, e.g. add leads or define new operations; and (c) log-out—this event terminates the session with the server. In some implementations, deep packet inspection logic tracks raw event data to identify events and stores them in an event repository. This application, in some implementations, interchangeably refers to "events" as "data", and vice-versa. Other examples of events generated by or about various entities include telemetry from a wearable sensor, data from a smart watch, data and/or metadata generated by a user using a feature of an application (such as Microsoft Word™), trip or journey data generated from a GPS used by a driver starting or completing a trip, data generated by a vehicle reporting speed or location information, data generated by a medical device reporting a sensor reading, etc.

Entity: An entity is defined as a thing or object that interacts and communicates with other things or objects and with the environment by exchanging data and information sensed about the environment while reacting to real/physical world events, to provide services for information transfer, analytics, applications and communications. Examples of entities include humans, online social networks, wireless/wired sensors, smart phones, smart watches, application PCs, PCs, laptops, tablets, IP telephones, servers, application servers, cameras, scanners, printers, near-field communication devices like RFID tags and RFID readers, vehicles, biomedical equipment, and others. In some implementations, the singular "entity" and the plural "entities" are used interchangeably in this application for clarity. In this application, in some implementations, "entities" are "data sources", "users", and other actors.

Online Social Network: An "online social network" is defined as any combination of software, protocols and/or hardware configured to allow a community of users or individuals and/or other entities to share information, resources and the like via a computer network (such as the Internet). An online social network uses a platform like a website, blog or forum to foster interaction, engagement and information sharing. Some examples of an online social network include Facebook™, Twitter™, YouTube™, Flickr™, Picasa™, Digg™, RSS™, Blogs™, Reddit™, LinkedIn™, Wikipedia™ Pinterest™, Google Plus+™, MySpace™, Bitly™ and the like. This application, in some implementations, interchangeably refers to "online social network" as "social network", "social media site", "social networking service", "social media source" and "social networking entity", and vice-versa.

Application Programming Interface: An "application programming interface (API)" is defined as a packaged collection of code libraries, methods and fields that belong to a set of classes, including its interface types. The API defines the way that developers and programmers can use the classes for their own software development, just by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. For example, Twitter's Search API involves polling Twitter's data through a search or username. Twitter's Search API gives developers and programmers access to data set that already exists from tweets which have occurred. Through the Search API, developers and programmers request tweets that match search criteria. The criteria can be keywords, usernames, locations, named places, etc. In another example, Twitter's Streaming API is a push of data as tweets are posted in near real-time. With Twitter's Streaming API, developers and programmers register a set of criteria (e.g., keywords, usernames, locations, named places, etc.) and as tweets match the criteria, they are pushed directly to the developers and programmers. In yet another example, Twitter Firehose pushes data to developers and programmers in near real-time and guarantees delivery of all the tweets that match the set criteria.

Application: An application refers to a network hosted service accessed via a uniform resource locator (URL). Examples include software as a service (SaaS) offerings, platform as a service (PaaS) offerings, and infrastructure as a service (IaaS) offerings, as well as internal enterprise applications. Examples of applications include Salesforce1 Platform™, Sales Cloud™, Data.com™, Service Cloud™, Desk.com™ Marketing Cloud™, Pardot™, Wave Analytics™, Box.net™, Dropbox™, Google Apps™, Amazon AWS™, Microsoft Office 365™, Workday™, Oracle on Demand™ Taleo™, Yammer™ and Concur™. In one implementation, an application offers insights to end-users in the form of rich visualization, using GUI and/or API based tools like standard graphs, bars, charts and overlaid infographics.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Introduction

We describe a system and various implementations of handling multiple task sequences including long tail task sequences on a limited number of worker nodes of a stream processing system. The technology disclosed includes defining containers over worker nodes that have physical threads, with one physical thread utilizing a whole processor core of a worker node. It also includes, for multiple task sequences, queuing data from incoming near real-time (NRT) data streams in pipelines that run in the containers, processing data from the NRT data streams as batches using a container-coordinator that controls dispatch of the batches, and dispatching the batches to the physical threads, where a batch runs to completion or to a time out, including during execution, comparing a count of available physical threads against a set number of logically parallel threads. It further includes, when a count of available physical threads equals or exceeds the number of logically parallel threads, concurrently processing the batches at the physical threads, and when there are fewer available physical threads than the number of logically parallel threads, multiplexing the batches sequentially over the available physical threads.

The technology disclosed improves existing streaming processing systems by allowing the ability to both scale up and scale down resources within an infrastructure of a stream processing system. In addition, the technology disclosed leverages common dependencies between task sequences running in a container to reduce the strain on shared resources by eliminating dedicated per-pipeline hardware. Furthermore, the technology disclosed introduces natural elasticity to stream processing systems by minimizing the impact of small workloads on the systems.

Apache Storm™, Apache Trident™, Apache Spark™, Apache Samza™ Apache Flink™, etc. and most existing stream processing systems have classically focused exclusively on scaling up and scaling out of computational resources in a quest for more performance. These systems do not typically perform well in a constrained resource environment such as a small two-to-three machine cluster. Spark for example simply starts crashing once its in-memory grid is exhausted and also requires a minimum of one dedicated core per consumed Kafka partition. Running a few hundred simultaneous consumers in these systems requires potentially hundreds of dedicated cores. Storm with a two-to-three machine cluster runs at most perhaps twelve tasks sequences before requiring addition of more machines. This makes these platforms appropriate only for large scale data processing that can justify the dedicated hardware required (which is what they are designed to serve).

For smaller, trivial workloads or data patterns that have wild variance in their load over time, these platforms are extremely expensive due to the minimum cost of hardware associated with a single "job". What this means to a user is that they would typically need to decide whether a job is "big enough" to justify porting it to something like Storm or Spark.

The technology disclosed particularly singles out long tail task sequences that may initially have heavy activity but may need to remain active for months waiting for perhaps dozens of messages a day. In this case, a big-data platform is needed for the initial activity and after the initial early load, the dedicated hardware would have historically been wasted because it mostly was doing nothing. In Storm, no matter how trivial the workload, if there are a thousand topologies, at least 1000 workers are needed to run them, which equates to roughly 250 machine instances if four workers are being run per machine. The technology disclosed allows for running one topology on a thousand machines or a thousand topologies on one machine.

The primary benefits of the disclosed solution include allowing users to run an arbitrary amount of work on a fixed hardware budget and allowing users to utilize the same environment, infrastructure and tools for both small and large jobs.

The technology disclosed also leverages common dependencies across task sequences. A job can always run in a dedicated container, which gives it full use of all available resources and excellent isolation from other processes. When jobs are multiplexed within the same container, they lose this isolation but gain locality which carries other benefits. For example, a typical application server shares a connection pool across all the applications hosted therein. The technology disclosed can greatly reduce the strain on shared resources such as databases and message buses like Kafka™, persistence stores like Cassandra™ and global service registry like ZooKeeper™. In the technology disclosed, connections to Kafka™, Cassandra™ and Zoo-Keeper™ are all shared across hosted pipelines, thereby greatly reducing the potential load on these services. In some cases, the technology disclosed can eliminate dedicated per-pipeline hardware by leveraging shared local caches of resources. For instance, dozens of pipelines can read from the same Kafka topic without the need to make a call to Kafka for every pipeline.

Large systems hosting multiple workloads tend to be more naturally elastic than dedicated systems. For example, threads doing small amounts of work introduce only small delays in busier threads because they only borrow shared resources for exactly the amount of time they are needed. Dedicated systems instead depend on monitoring and dynamic allocation of resources, ideally adding and removing servers as workloads change. This is complicated to implement and plan for with an accurate budget. The technology disclosed adapts a stream processing system to minimize the impact of small workloads, thereby making the system more naturally elastic and more gracefully changeable as workloads change. An example includes two tasks sequences, one for the U.S. and one for Europe. These two task sequences receive the bulk of their loads at opposite times of day. The technology disclosed applies most of the allocated resources (e.g. ninety percent) to the tasks sequence with actual load without a complex system of adding boxes for the time from 12 am to 4 am on one task sequence and adding boxes for the time from 3 pm to 6 pm on the other.

The technology disclosed relates to simplifying for a non-programming user creation of an entity management workflow by using computer-implemented systems. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

In addition, the technology disclosed can be implemented using different programming models like MapReduce™, bulk synchronous programming, MPI primitives, etc. or different stream management systems like Apache Storm™, Apache Spark™, Apace Kafka™, Truviso™, IBM InfoSphere™, Borealis™ and Yahoo! S4™.

IoT Platform and Stream-Batch Processing Framework

Figure 2:
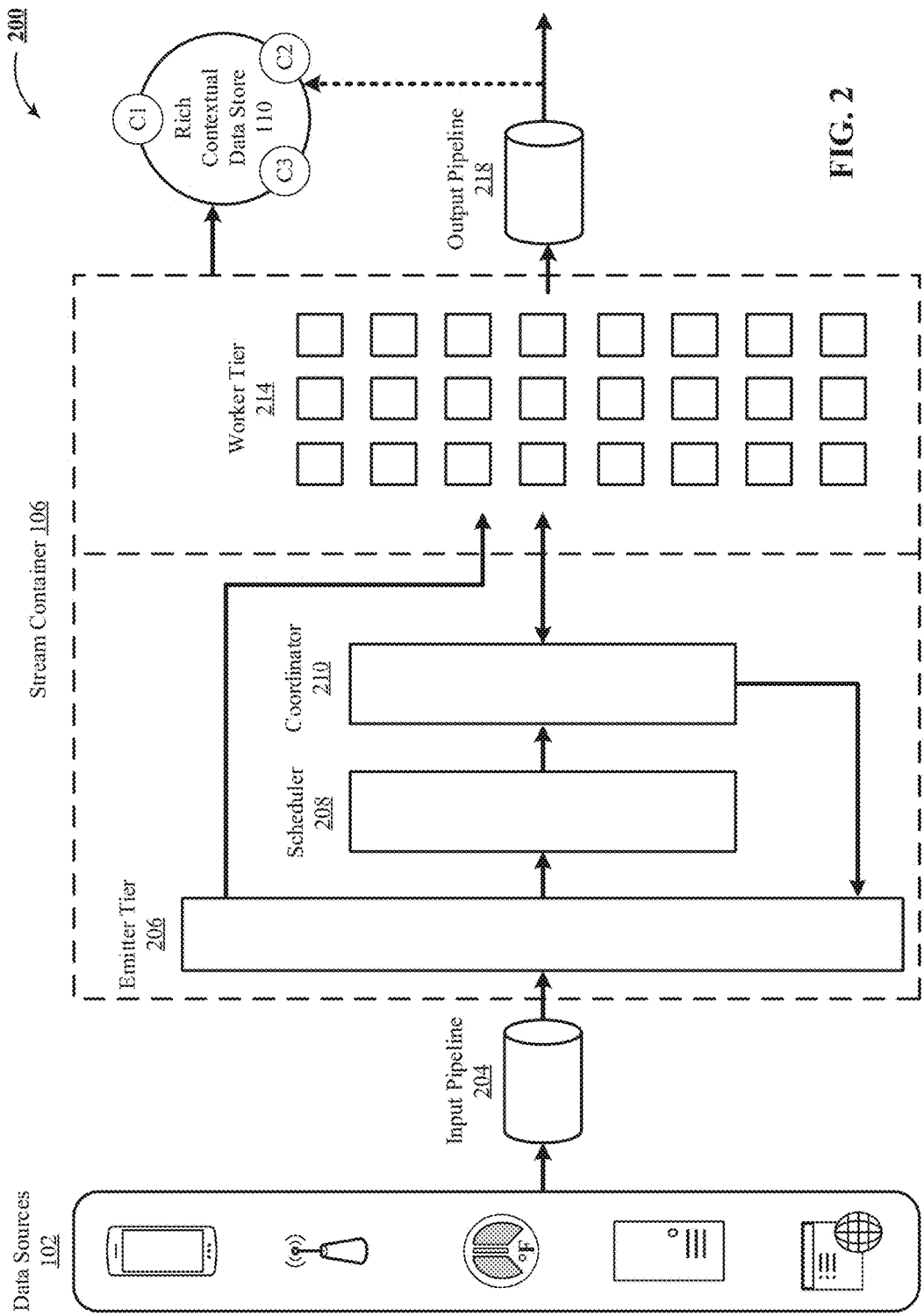
FIG. 2 illustrates a stream processing framework used by an IoT platform similar to the example IoT platform shown in FIG. 1, according to one implementation of the technology disclosed.

We describe a system and various implementations of simplifying for a non-programming user creation of an entity management workflow. The system and processes will be described with reference to FIG. 1 and FIG. 2 showing an architectural level schematic of a system in accordance with an implementation. Because FIG. 1 and FIG. 2 are architectural diagrams, certain details are intentionally omitted to improve the clarity of the description. The discussion of FIG. 1 and FIG. 2 will be organized as follows. First, the elements of respective figures will be described, followed by their interconnections. Then, the use of the elements in the system will be described in greater detail.

FIG. 1 includes exemplary IoT platform 100. IoT platform 100 includes data sources 102, input connectors 104, stream container(s) 106, batch container(s) 108, rich contextual data store 110, orchestration system 112, output connectors 122 and application(s) 123. The rich contextual data store 110 includes various storage nodes C1-C3. Orchestration 112 includes a data entry columnar 114, an explorer engine 115, a live dashboard builder engine 116, a morphing engine 117, a tweening engine 118, a tweening stepper 119, an integrated development environment (IDE) 121 and a rendering engine 120. Application(s) 123 include various SaaS, PaaS and IaaS offerings. In other implementations, platform 100 may not have the same elements as those listed above and/or may have other/different elements instead of, or in addition to, those listed above.

FIG. 2 illustrates a stream processing framework 200 used in the platform example shown in FIG. 1, according to one implementation of the technology disclosed. Framework 200 includes data sources 102, input pipeline 204, stream container 106, rich contextual data store 110 and output pipeline 218. Stream container 106 includes an emitter tier 206, a scheduler 208, a coordinator 210 and a worker tier 214. In other implementations, framework 200 may not have the same elements as those listed above and/or may have other/different elements instead of, or in addition to, those listed above.

The interconnection of the elements of IoT platform 100 and streaming framework 200 will now be described. A network (not shown) couples the data sources 102, the input connectors 104, the stream container 106, the batch container 108, the rich contextual data store 110, the orchestration system 112, the columnar 114, the output connectors 122, the application(s) 123, the input pipeline 204, the emitter tier 206, the scheduler 208, the coordinator 210, the worker tier 214 and the output pipeline 218, all in communication with each other (indicated by solid arrowed lines). The actual communication path can be point-to-point over public and/or private networks. Some items, such as data from data sources 102, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, OAuth, Kerberos, SecureID, digital certificates and more, can be used to secure the communications.

Having described the elements of FIG. 1 (IoT platform 100) and FIG. 2 (streaming framework 200) and their interconnections, the system will now be described in greater detail.

Data sources 102 are entities such as a smart phone, a WiFi access point, a sensor or sensor network, a mobile application, a web client, a log from a server, a social media site, etc. In one implementation, data from data sources 102 are accessed via an API Application Programming Interface) that allows sensors, devices, gateways, proxies and other kinds of clients to register data sources 102 in the IoT platform 100 so that data can be ingested from them. Data from the data sources 102 can include events in the form of structured data (e.g. user profiles and the interest graph), unstructured text (e.g. tweets) and semi-structured interaction logs. Examples of events include device logs, clicks on links, impressions of recommendations, numbers of logins on a particular client, server logs, user's identities (sometimes referred to as user handles or user IDs and other times the users' actual names), content posted by a user to a respective feed on a social network service, social graph data, metadata including whether comments are posted in reply to a prior posting, events, news articles, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

As described infra, near real-time (NRT) data streams 103 are collections of events that are registered as they are generated by an entity. In one implementation, events are delivered over HTTP to input pipeline 204. In another implementation, events are transmitted via POST requests to a receiver operating on behalf of input pipeline 204. For instance, Twitter Firehose API (accessible via Twitter-affiliated companies like Datashift, nTweetStreamer, tiwwter4j) provides unbounded time stamped events, called tweets, as a stream of JSON objects along with metadata about those tweets, including timestamp data about the tweets, user information, location, topics, keywords, retweets, followers, following, timeline, user line, etc. These JSON objects are stored in a schema-less or NoSQL key-value data-store like Apache Cassandra™, Google's BigTable™, HBase™ Voldemort™, CouchDB™, MongoDB™, Redis™, Riak™, Neo4j™, etc., which stores the parsed JSON objects using key spaces that are equivalent to a database in SQL. Each key space is divided into column families that are similar to tables and comprise of rows and sets of columns.

The input connectors 104 acquire data from data sources 102 and transform the data into an input format that is consumable by containers 106 and 108. In one implementation, the input connectors 104 perform full data pulls and/or incremental data pulls from the data sources 102. In another implementation, the input connectors 104 also access metadata from the data sources 102. For instance, the input connectors 104 issue a "describe" API call to fetch the metadata for an entity and then issue the appropriate API call to fetch the data for the entity. In some implementations, customized input connectors 104 are written using the Connector SDK™ for individual data sources 102.

In other implementations, a workflow definition includes a collection of connectors and operators as well as the order to execute them. In one implementation, such a workflow is specified as a directed graph, where connectors and operators are graph nodes and edges reflect the data flow. In yet other implementations, multiple data streams 103 are joined and transformed before being fed to the containers 106 and 108.

Batch processing framework operating in container(s) 108 generates business intelligence using OnLine Analytical Processing (OLAP) queries, which are stored in rich contextual data store 110. In one implementation, events are stored in batch container(s) 108 to act as a backup for raw events on which batch processing jobs can run at any given time. Batch container(s) 108, in some implementations, provides raw counts as well as descriptive statistics such as mean, median and percentile breakdowns. In one implementation, analytics tool like Scalding™ and Pig™ are included in batch container(s) 108 to provide retrospective analysis, machine learning modeling, and other batch analytics. In yet other implementations, batch container(s) 108 is used to correct errors made by the stream container 106 or to handle upgraded capabilities by running analytics on historical data and recompute results. Examples of a batch processing framework include Hadoop distributed file system (HDFS) implementing a MapReduce programming model.

Batch container(s) 108 ingest event tuples from respective input pipelines that collect data for a plurality of NRT data streams. In some implementations, multiple NRT data streams can be assigned to a single pipeline and multiple pipelines can be assigned to a single batch container.

Stream processing framework 200 provides near real-time (NRT) processing of sequences of unbounded events for delivery of immediate analytics and insights based on the events as they are occurring. In one implementation, framework 200 processes one million events per second per node. Framework 200 can be implemented using one or more stream processors like Apache Storm™ and Apache Samza™ or a batch-stream processor such as Apache Spark™. In one implementation, framework 200 includes an API to write jobs that run over a sequence of event-tuples and perform operations over those event-tuples.

Events are ingested into framework 200 by input pipeline 204, which reads data from the data sources 102 and holds events for consumption by the stream container 106. In one implementation, input pipeline 204 is a single delivery endpoint for events entering the container 106. Examples of input pipeline 204 include Apache Kafka™ Kestrel™, Flume™, ActiveMQ™, RabbitMQ™, HTTP/HTTPS servers, UDP sockets, and others. In some implementations, input pipeline 204 includes a listener capable of listening NRT data streams 103 and data flows originating from the data sources 102 by connecting with their respective APIs (e.g., Chatter API, Facebook API (e.g., Open Graph), Twitter API (e.g., Twitter Firehose, Sprinklr, Twitter Search API, Twitter Streaming API), Yahoo API (e.g., Boss search) etc.) via the Internet. In some implementations, a listener includes heterogeneous instances responsible for the intake of data from different data sources 102. According to an implementation, the input pipeline 204 can be configured to receive the data over the network(s) using an application protocol layer, or other higher protocol layer, such as HTTP protocol layer, among many possible standard and proprietary protocol layers. These higher protocol layers can encode, package and/or reformat data for sending and receiving messages over a network layer, such as Internet Protocol (IP), and/or a transport layer, such as Transmission Control Protocol (TCP) and/or User Datagram Protocol (UDP).

In a particular implementation, Apache Kafka™ is used as the input pipeline 204. Kafka is a distributed messaging system with a publish and subscribe model. Kafka maintains events in categories called topics. Events are published by so-called producers and are pulled and processed by so-called consumers. As a distributed system, Kafka runs in a cluster, and each node is called a broker, which stores events in a replicated commit log. In other implementations, different messaging and queuing systems can be used.

In one implementation, NRT data streams 103 are queued in input pipeline 204 as batches. In one implementation, a batch is defined as an assemblage of event tuples, also referred to as "units of work", partitioned on a time-slice basis and/or a batch-size basis. A time-slice based definition includes partitioning at least one incoming NRT data stream by its most recently received portion within a time window (e.g., one batch keeps the event tuples from last one second). A batch-size based definition includes partitioning at least one incoming NRT data stream by a most recently received portion limited or restricted to or constrained by a data size (e.g., one batch includes 10 MB of most recently received event tuples). In other implementations, a combination of time-size basis and batch-size basis is used to define batches.

In a particular implementation, Apache Storm™ operates in stream container 106 and performs real-time computation using a matrix of user-submitted directed acyclic graphs, comprised of a network of nodes called "Spouts" or "emitter nodes" (collectively referred to as the emitter tier 206 in FIG. 2) and "Bolts" or "worker nodes" (collectively referred to as the worker tier 214 in FIG. 2). In a Storm matrix, a Spout is the source of NRT data streams 103 and a Bolt holds the business logic for analyzing and processing those streams to produce new data as output and passing the output to the next stage in the matrix. In one implementation, a special Kafka Spout emits events read from a Kafka topic as batches to the bolts in worker tier 214.

Worker tier 214 includes bolts or worker nodes (shown as cubes in FIG. 2) that perform various stream processing jobs such as simple data transformation like id to name lookups, up to complex operations such as multi-stream joins. Specifically, worker nodes in the worker tier 214 can perform tasks like aggregations, functions and stream groupings (e.g., shuffle grouping, fields grouping, all grouping, and global grouping), filtering and commits to external persistence layers like rich contextual data store 110. In some implementations, worker nodes in a worker tier 214 have transitive dependencies between related processing stages where upstream stages produce event tuples that are consumed by downstream stages.

The messages passed within stream container 106 are called tuples. A tuple is a set of values for a pre-defined set of fields. Each spout and bolt defines the fields of the tuples it emits statically in advance. All tuples are serialized into a binary form before transmission to other components in the stream container 106. In some implementations, this serialization is handled by the Kryo library, which provides a fast serialization of Java objects.

Stream container 106 allows for parallelization of spouts and bolts using different tuple grouping strategies to pass event streams. The grouping strategy defines the partitioning of an event stream and controls the number of logically parallel threads of the next computational unit—the degree of parallelism refers to the number of parallel executions.

Scheduler 208 tracks one or more input pipelines (e.g., input pipeline 204) in the stream container 106 and schedules execution of batches and any downstream processing stages that depend on the output of an upstream completed processing stage. In one implementation, scheduler 208 assigns a unique batch identifier (ID) to each batch in the input pipeline 204. Further, scheduler 208 triggers either a resend of the current batch or the next batch along with corresponding stage information on a per pipeline basis. Scheduler 208 also sends messages to the coordinator 210 in the form [pipeline:'a',batch:7,stage'b']. In some other implementations, scheduler 208 assigns priority-levels to different pipelines in the IoT platform 100. These priority-levels control execution of a first number of batches from a first pipeline before execution of a second number of batches from a second pipeline.

Coordinator 210 controls dispatch of batches to worker nodes in the worker tier 214. When the scheduler 208 triggers a batch-stage, the coordinator 210 sends triggers to the emitter tier 206 and worker tier 214 who are responsible for that particular stage. When [pipeline:'a',batch:7, stage'b'] is received by the coordinator 210, it contacts two of the hundred available worker nodes. These are the two worker nodes that received input from stage 'a'.

Coordinator 210 also tracks pending units of work in the stream container 106 for a given batch-stage to enable efficient "long-tail" operations where it is likely that a substantial portion of the allocated resources for a process may not be needed for a particular batch. Take a single distributed operation having stage [a] and stage [b] such that the output of stage [a] is used at stage [b], represented as stage [a]→stage [b]. Now, assume that according to one implementation stage [a] runs on hundred worker nodes (each running on a physical node) and stage [b] runs on hundred worker nodes (each running on a physical node) and stage [a] produces output only for two instances of stage [b]. When stage [a] has fully executed and stage [b] begins, the coordinator 210 knows that only two of the hundred worker nodes allocated to stage [b] need to be invoked. Similarly for three stage processing, represented as stage [a]→stage [b]→stage [c], where stage [b] receives no input from stage [a] and therefore stage [c] will also receive no input, coordinator 210 avoids all extraneous communication to stage [b] and stage [c]. In the case of all data in stage [a] being filtered out, there is no communication overhead with the worker nodes allocated to stage [b] and stage [c].

Stream container(s) 106 ingest event tuples from respective input pipelines that collect data for a plurality of NRT data streams. In some implementations, multiple NRT data streams can be assigned to a single pipeline and multiple pipelines can be assigned to a single stream container.

Rich contextual data store 110 stores large volumes of historical data and allows for historical query based analytics that are combined with near real-time analytics. In one implementation, rich contextual data store 110 is used to take a snapshot of tasks in the IoT platform 100 and store state information about the pipelines, spouts, bolts and other elements of the IoT platform 100. In some implementations rich contextual data store 110 is a NoSQL key-value column store distributed storage system like Apache Cassandra™. Data sent to Cassandra™ is spread out across many nodes or commodity servers C1-C3, connections to which can be made using a Java, Scala, Ruby, Clojure or Python based APIs (e.g., Hector, Pelops, CQL, Thrift, Phpcassa, PyCassa, etc.). Cassandra stores data in units called columns. Each column is a tuple, a list of associated data elements. The basic column format can be represented as (name, value, timestamp). For brevity, the timestamp, while an essential element of the column, is often not written. Thus, an example column may be written (UserName, User-1). An optional level of hierarchy called a super column may incorporate any number of columns. Moving up a level, keys (sometimes referred to as rows) are tuples that include a name and one or more columns or super columns. An example key may be written (Status_Key, (UserName, User-1), (Logged_In, Y). Any number of keys may be grouped into a column family. Analogously, a group of column families is referred to as the keyspace, the final level of hierarchy. Two pseudo code representations of the relationship can be constructed as follows:

[keyspace] [column family] [key] [column]
[keyspace] [column family] [key] [super column] [column]

Output pipeline 218 collects and queues processed events for delivery to a persistent store. In one implementation, data from output pipeline 218 is transmitted concurrently to a SQL data store and NoSQL data store like rich contextual data store 110. Output pipeline 218 can also be hosted by Kafka, which acts a sink for the output of the jobs.

Orchestration

Orchestration 112 includes a web platform that enables non-programmers to construct and run an entity management workflow. Orchestration 112 utilizes a declarative and visual programming model that generates a data entry columnar 114, which accepts declarative and drag-drop input. In one implementation, orchestration 112 allows non-programmers to design their own workflows visually without extensive programming knowledge. In one implementation, orchestration 112 uses a formal declarative description stored in a JSON configuration file. The JSON file defines behaviors used in a session, including states of an entity during a life cycle that specify events to handle, state transition triggers the transition rules to be used, and responsive actions that specify the actions rules to be used, along with other parameters and variables to be used in a workflow. In other implementations, different programming languages like hypertext markup language (HTML), standard generalized markup language (SGML), declarative markup language (DML), extensible markup language (XAML and XML), extensible stylesheet language (XSL), extensible stylesheet language transformations (XSLT), functional programming language like Haskell and ML, logic programming language like Prolog, dataflow programming language like Lucid, rule-based languages like Jess, Lips and CLIPS, and others.

In another implementation, orchestration 112 includes a declarative component and a run-time component. Using the declarative component, a non-programmer declares entity states, transition triggers for the states, responsive actions for the states and other parameters and variables of the entity lifecycle workflow. In one implementation, the declarative component offers existing workflow or workflow excerpts common used by other users and communities. In one implementation, the declarative input is received at a browser in a visual manner rather than as a result of writing code. The declarative input is then translated by orchestration 112 into a package of declarative files (e.g., XML) that can be directly executed in the run-time component.

In a further implementation, the run-time component of orchestration 112 includes a translator that interprets the declarative files using relational and XML-native persistent services, gateway, SOAP, REST API and semantic functionalities like machine learning, clustering, classifier-based classification and recommendation, context text analysis, text extraction and modeling, deep linguistic analysis and expressions based alphanumeric pattern detection.

In yet another implementation, orchestration 112 serves as a rule engine and scripting environment for non-declarative languages like Java and C++. In such an implementation, orchestration 112 provides rule-based programming in a high-level procedural or imperative programming language by continuously applying a set of rules to a set of facts. The rules can modify the facts or execute and procedural or imperative code (e.g., Java code). In some implementations, orchestration 112 includes a graphical rule development environment based on an integrated development environment (IDE) providing editor functions, code formatting, error checking, run and debug commands and a graphical debugger.

Orchestration 112 also includes an explorer engine 115, a live dashboard builder engine 116, a morphing engine 117, a tweening engine 118, a tweening stepper 119, an integrated development environment (IDE) 121 and a rendering engine 120.

A disclosed live dashboard builder engine 116 designs dashboards, displaying multiple analytics developed using the explorer engine 115 as real-time data query results. That is, a non-technical user can arrange display charts for multiple sets of query results from the explorer engine 115 on a single dashboard. When a change to a rule-base affects any display chart on the dashboard, the remaining display charts on the dashboard get updated to reflect the change. Accurate live query results are produced and displayed across all display charts on the dashboard.

In one implementation, a real-time query language called "EQL language" is used by orchestration 112 to enable data flows as a means of aligning results. It enables ad hoc analysis of registered event tuples. A non-technical user can specify state definitions, state transition triggers, state transition conditions and state transition actions to change query parameters and can choose different display options, such as a bar chart, pie chart or scatter plot—triggering a real-time change to the display chart—based on a live data query using the updated rule-base. Statements in EQL include keywords (such as filter, group, and order), identifiers, literals, or special characters. EQL is declarative; you describe what you want to get from your query. Then, a query engine will decide how to efficiently serve it.

In one implementation, a runtime framework with an event bus handles communication between application(s) 123 running on user computing devices, a query engine (not shown) and an integrated development environment 121, which provides a representation of animated data visualizations implemented in a hierarchy of levels including states, triggers, state transitions, responsive actions, entity activity levels and variations among them over time, real-time event streams, trails of entity transitions from one state to another, and the sizes of the state types based on a number of entities belonging to a particular state type.

Integrated development environment 121 provides a representation of animated data visualizations and provides an interface for processing animation scripts that animate transitions between the shapes applied to data visualizations. Example animation transitions include scaling so that charts fit the display environment, and are not clipped; and rotations between vertical and horizontal display. Animation scripts are represented using non-procedural data structures that represent shapes to be rendered, and that represent animations of the transitions between the shapes to be rendered. In one example implementation, JSON can be used to express the generated non-procedural data structures.

Rendering engine 120 transforms non-procedural data structures that represent the shapes and the animation of transitions between the shapes, into rendered graphics.

In other implementations, orchestration 112 may not have the same elements as those listed above and/or may have other/different elements instead of, or in addition to, those listed above.

The output connectors 122 send data from orchestration 112 and/or output pipeline 218 and transform the data into an output format that is consumable by application(s) 123. In one implementation, the output connectors 122 perform full data pushes and/or incremental data pushes from orchestration 112. In another implementation, the output connectors 122 also provide metadata from the orchestration 112. In some implementations, customized output connectors 122 are written using the Connector SDK™ for individual application(s) 123.

Application(s) 123 include components adapted for operating in the IoT platform 100. The IoT platform 100, or an analog, can be provided by a node such as an application server node. Application(s) 123 can include an incoming and outgoing data handler component for receiving and transmitting information from and to the plurality of application server nodes via the network(s).

In an implementation, the application(s) 123 include a data store for storing a plurality of data objects including a plurality of contact records, a plurality of account records, and/or other records (collectively application records). In some implementations, an application record can include, but is not limited to, a tuple corresponding to a user, a file, a folder, an opportunity, an account, an event, and/or any data object. Application(s) 123 can include a data manager component that can be configured to insert, delete, and/or update the records stored in the data store. In addition, application(s) 123 can include a monitoring agent that is configured to monitor activities related to the application records. For example, the monitoring agent can be configured to track a user's post via a public or private social networking service, and/or a user's e-mail client on the user's enterprise desktop computer, and to monitor updates to the contact records, event records, and/or any other application record(s) stored in the data store.

Processed events can additionally be used by application(s) 123, such as Salesforce.com offerings like Sales Cloud™, Data.com™, Service Cloud™, Desk.com™ Marketing Cloud™, Pardot™, Service Cloud™ and Wave Analytics™. For example, processed events can be used to identify opportunities, leads, contacts, and so forth, in the application(s) 123, or can be used to support marketing operations with products such as Radian6™, Buddy Media™ services, and the like. The processed events can also then in turn be used to find these specific users again on these social networks, using matching tools provided by the social network providers. Additionally they could also be layered with specific targeting learned from the aggregation and analysis by the stream container 106 and orchestration 112 respectively.

In an implementation, IoT platform 100 can be located in a cloud computing environment, and may be implemented as a multi-tenant database system. As used herein, the term multi-tenant database system refers to those systems in which various elements of hardware and software of the database system may be shared by one or more tenants. For example, a given application server may simultaneously process requests for a great number of tenants, and a given database table may store rows for multiple tenants.

In some implementations, the elements or components of IoT platform 100 can be engines of varying types including workstations, servers, computing clusters, blade servers, server farms, or any other data processing systems or computing devices. The elements or components can be communicably coupled to the databases via a different network connection. For example, stream container 106 can be coupled via the network(s) (e.g., the Internet), batch container 108 can be coupled via a direct network link, and orchestration 112 can be coupled by yet a different network connection.

In some implementations, databases used in IoT platform 100 can store information from one or more tenants into tables of a common database image to form a multi-tenant database system. A database image can include one or more database objects. In other implementations, the databases can be relational database management systems (RDBMS), object oriented database management systems (OODBMS), distributed file systems (DFS), no-schema database management systems, or any other data storing systems or computing devices.

While IoT platform 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Concurrent and Multiplexed Processing Combination

FIG. 3 is one implementation 300 of worker tier 214 that includes a worker node 1, with a plurality of physical threads PT1-PT10. Each physical thread PT1-PT10 utilizes a whole processor core of the worker node 1 selected from one of the processor cores 1-10. Worker tier 214 also includes worker nodes 2-3, which have their own seta of physical threads, with each physical thread utilizing a whole processor core.

Figure 4A:
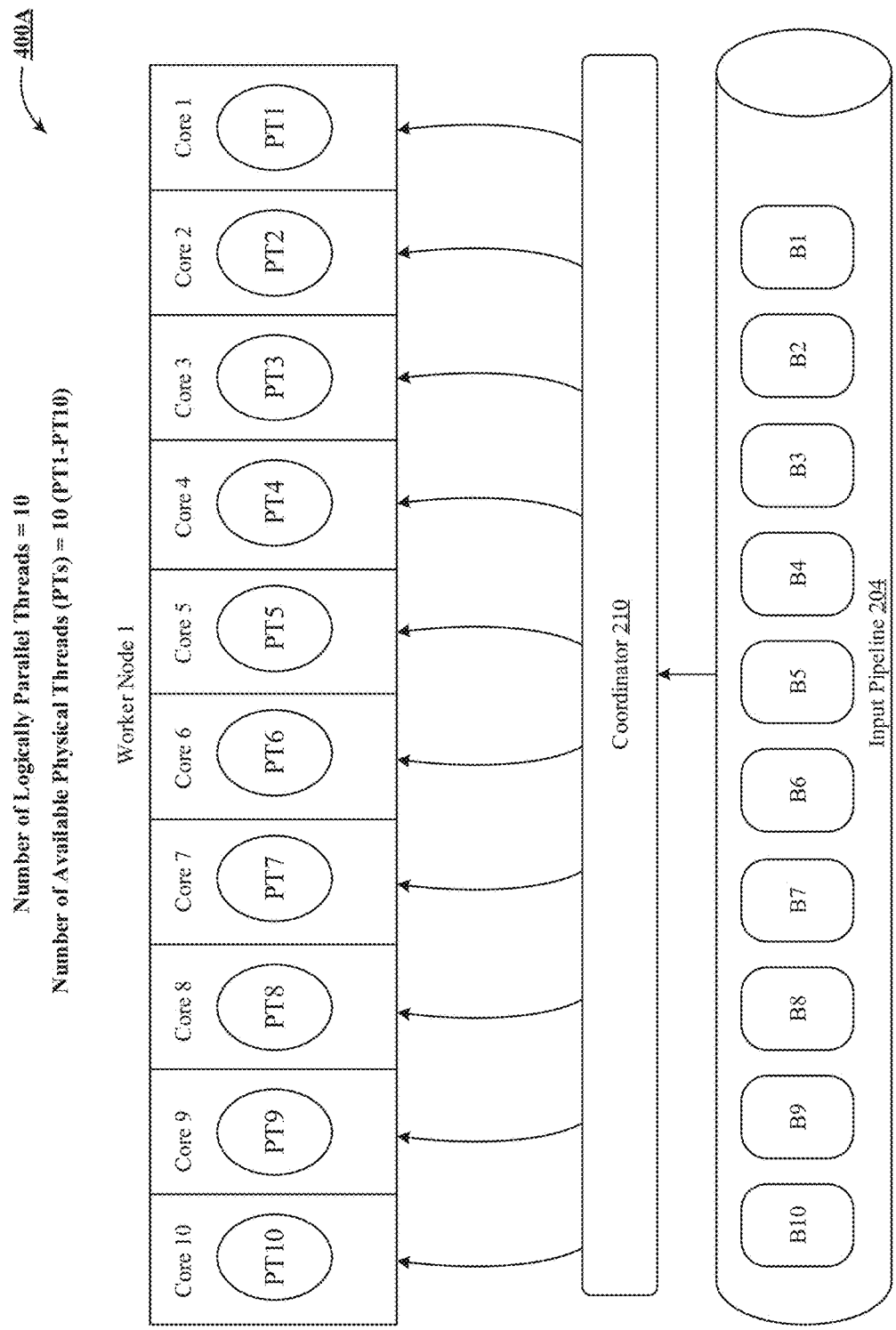
FIG. 4A and FIG. 4B depict one implementation of concurrently processing batches in a pipeline when a count of available physical threads equals or exceeds a set number of logically parallel threads.
Figure 4B:
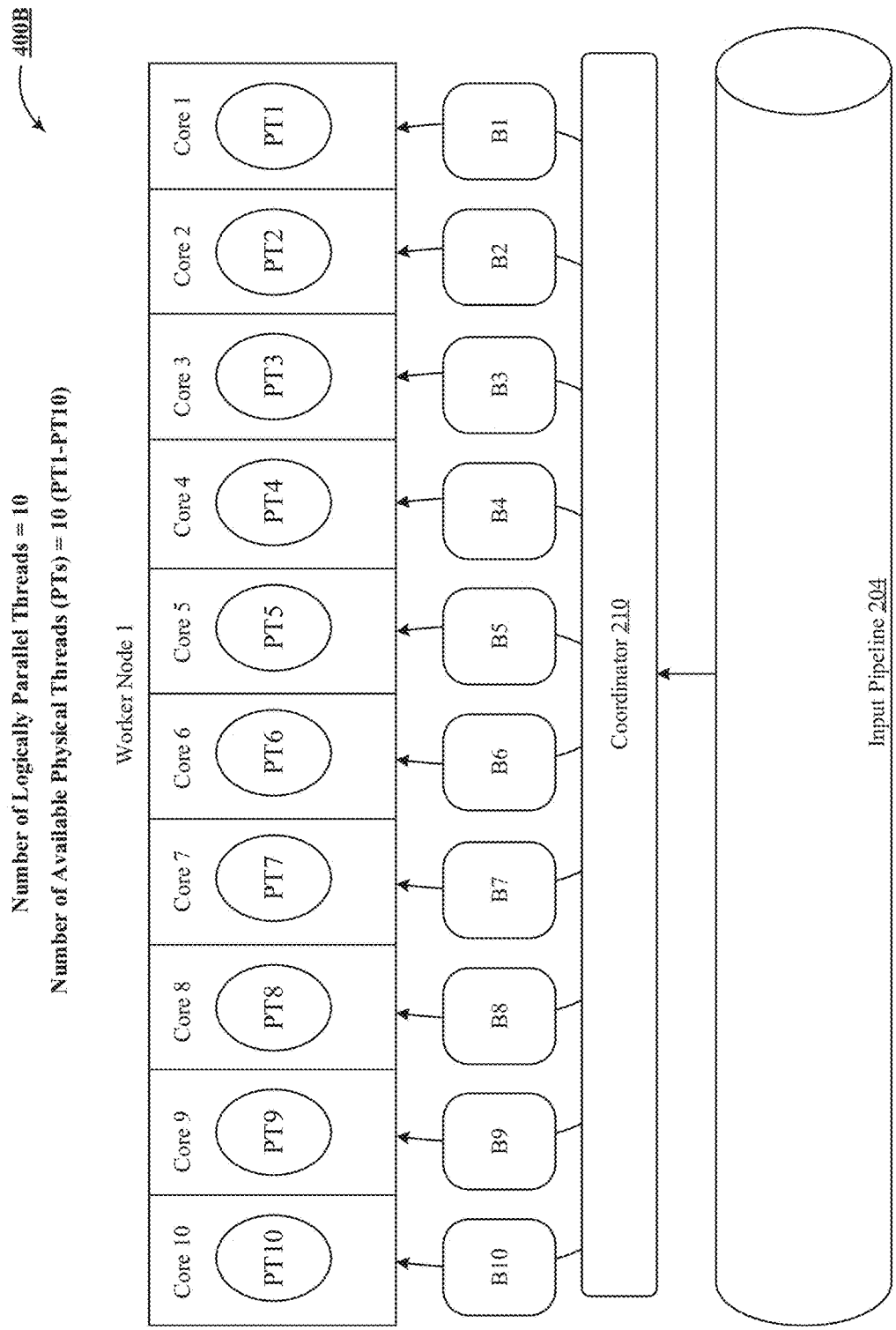

FIG. 4A depicts one implementation 400A of concurrently processing batches in a pipeline, when a count of available physical threads equals or exceeds a set number of logically parallel threads. In exemplary scenario illustrated in FIG. 4A, the number of logically parallel threads i.e. degree of parallelism is ten. Also in FIG. 4A, the number of available physical threads is ten i.e. PT1-PT10. Thus, when ten batches B1-10 are queued in input pipeline 204, coordinator 210 concurrently processes the batches B1-B10 at the available ten physical threads PT1-PT10, as shown in FIG. 4B. This concurrent processing 400B occurs because, at run-time, the coordinator determined that the count of available physical threads PT1-PT10 equaled the set number of logically parallel threads (ten).

Figure 5A:
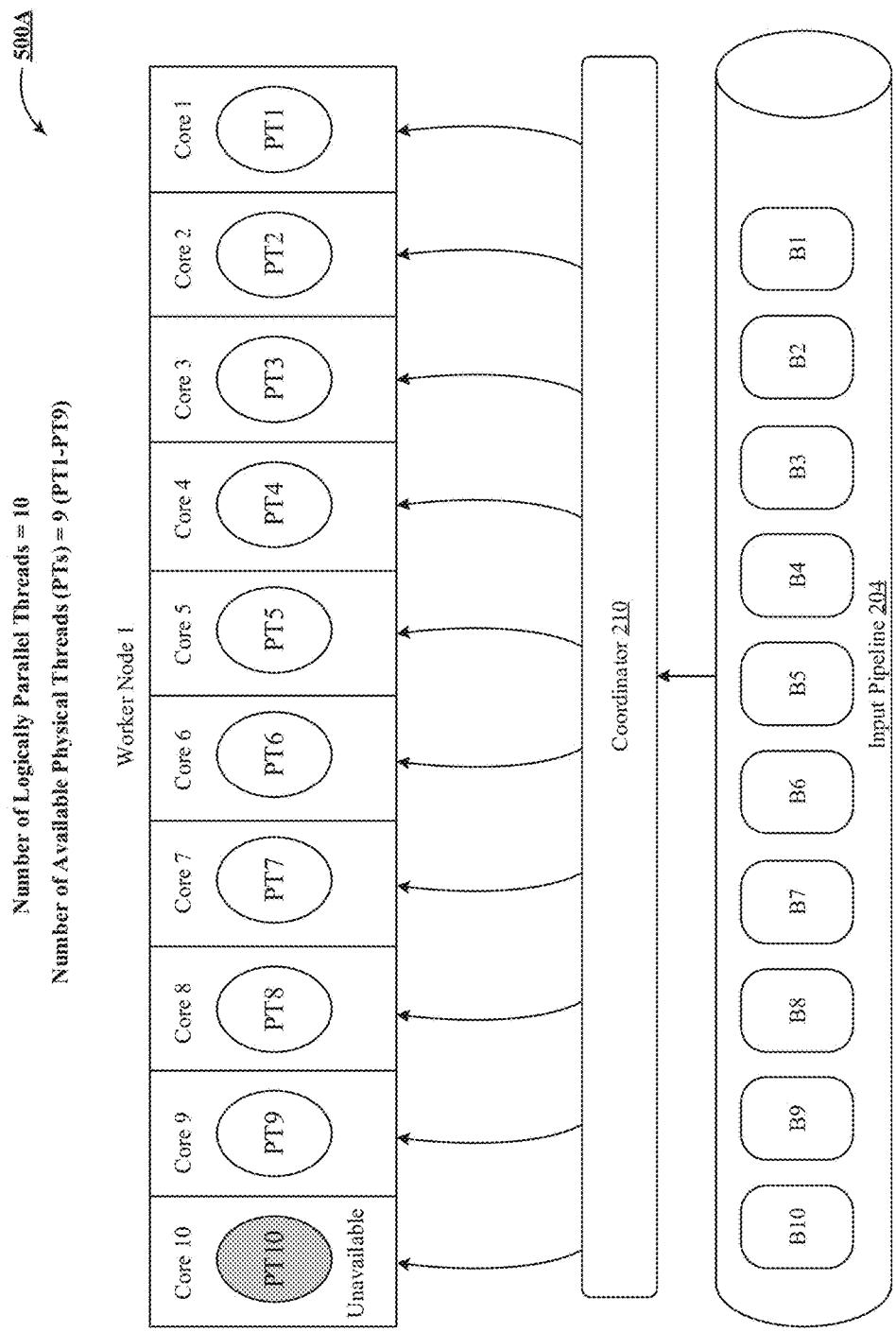
FIG. 5A, FIG. 5B and FIG. 5C show one implementation of multiplexing batches in a pipeline sequentially when there are fewer available physical threads than a set number of logically parallel threads.
Figure 5B:
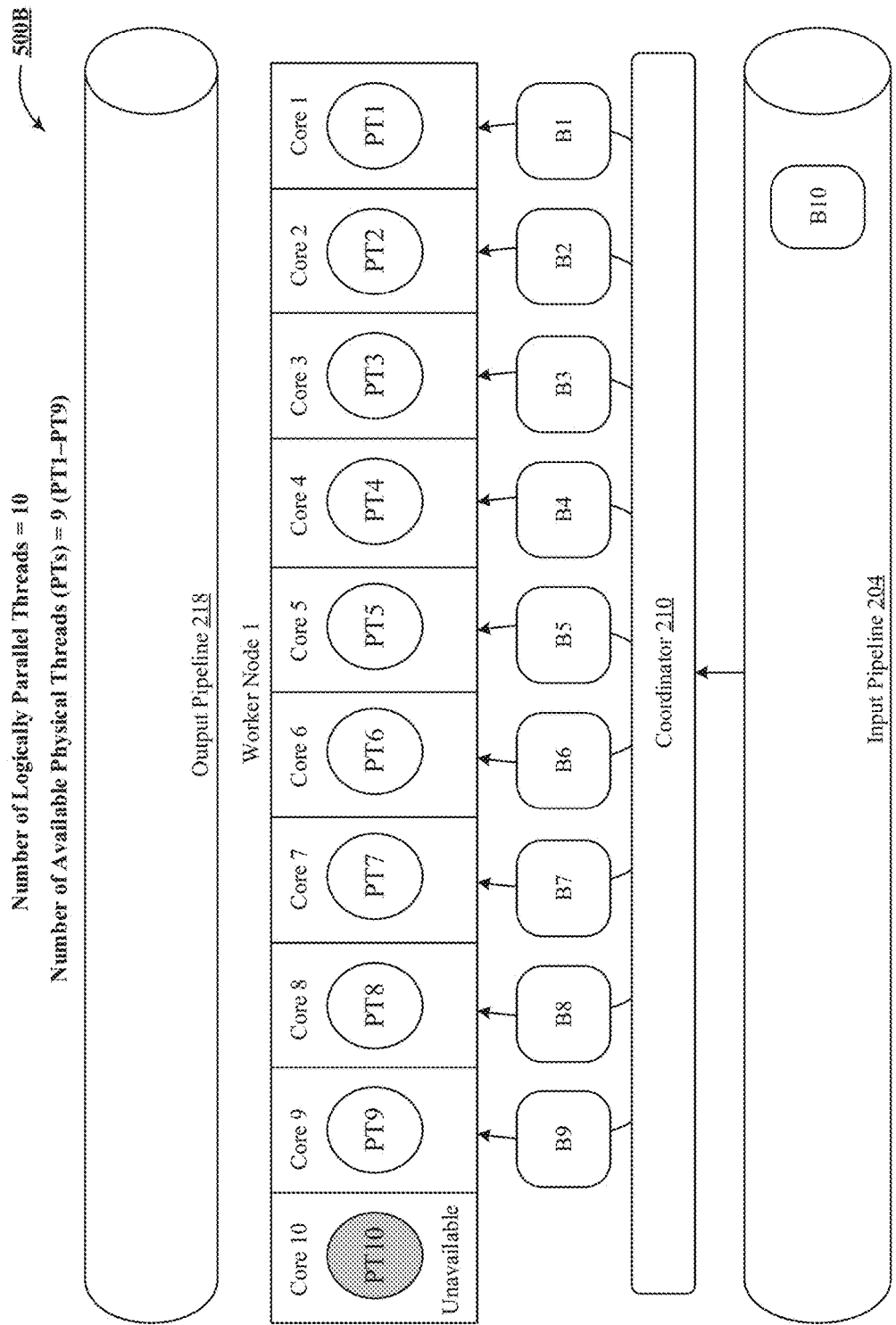
Figure 5C:
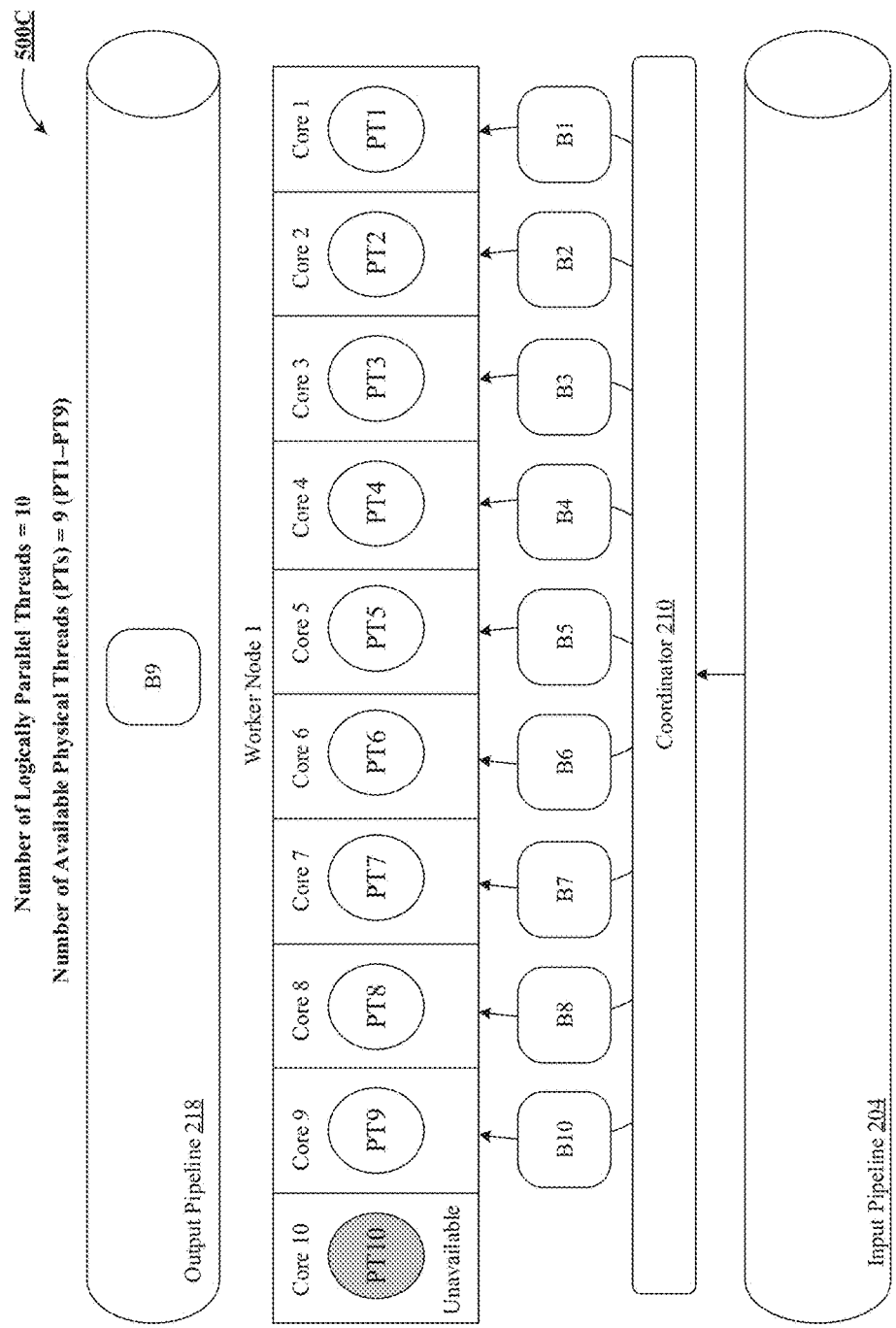

FIG. 5A, FIG. 5B and FIG. 5C show one implementation 500A-C of multiplexing batches B1-10 in a pipeline when there are fewer available physical threads than a set number of logically parallel threads. In exemplary scenario 500A illustrated in FIG. 5A, a set number of logically parallel threads i.e. parallelism is ten. However, the number of available physical threads is only nine i.e. PT1-PT9. The unavailable physical thread PT10 is depicted by a greyed-out box in FIG. 5A, FIG. 5B, and FIG. 5C. In some implementations, unavailability refers to that fact that an excessive or equaling thread has not even been initiated, and for such an implementation the unavailable physical thread PT10 would not have been depicted in FIG. 5A, FIG. 5B, and FIG. 5C. In other implementations, unavailability refers to the fact that an already initiated physical thread has failed and is not capable of processing batches, as depicted in the exemplary scenario of FIG. 5A, FIG. 5B, and FIG. 5C.

The technology disclosed adapts to this discrepancy in the available computation resources PT1-PT10 and the data units B1-B10 to be processed by multiplexing the batches B1-B10 sequentially over the nine available physical threads PT1-PT9. Multiplexing includes concurrently processing batches B1-B9 over the available physical threads PT1-PT9 and when one of the batch (like B9) from batches B1-B9 completes processing by the available physical thread or queues at the output pipeline 218, the next batch B10 in the input pipeline 204 is processed at the next available physical thread (like PT9) by the coordinator 210, as shown in FIG. 5C.

Flowchart

Figure 6:
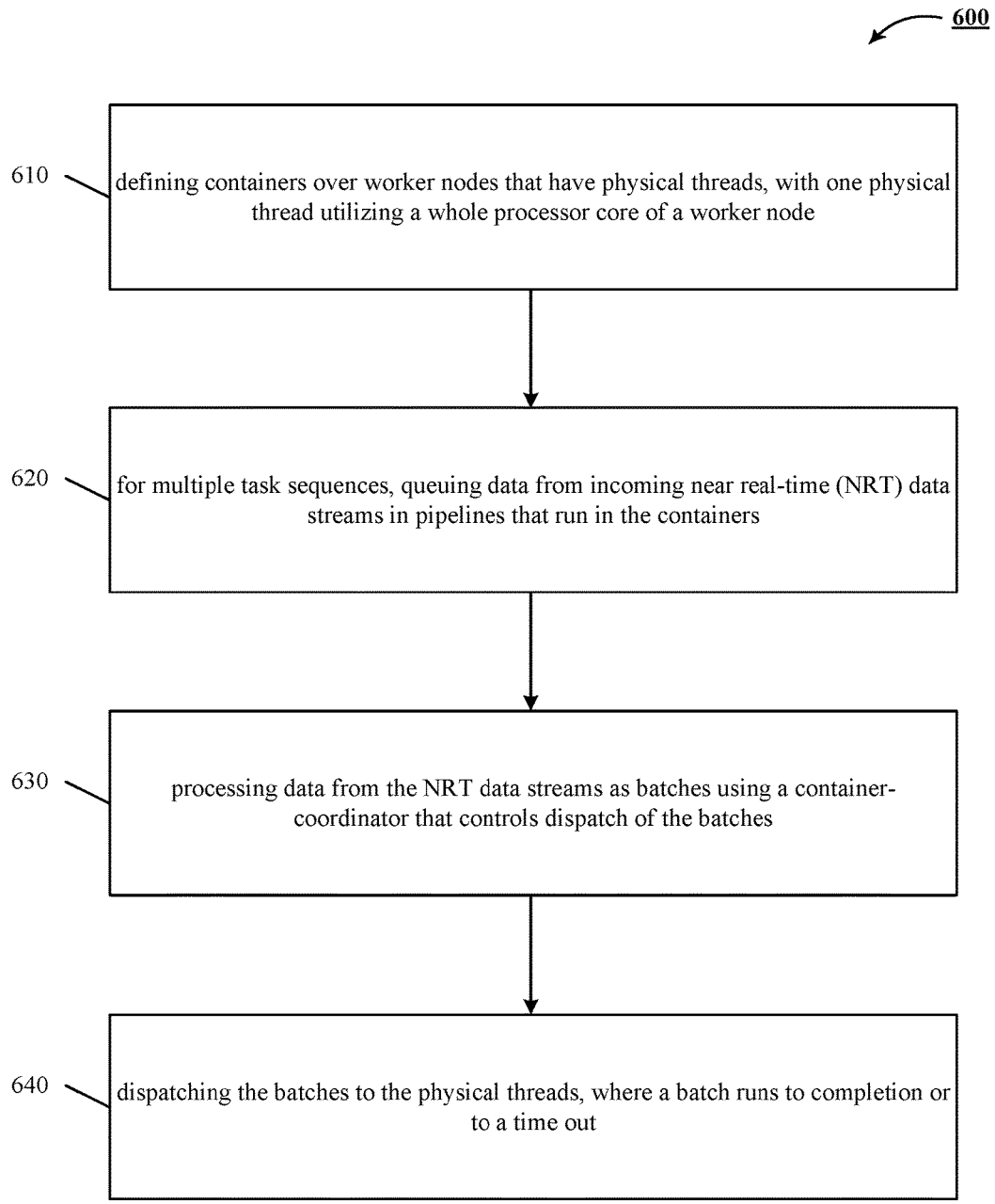
FIG. 6 shows one implementation of a flowchart of handling multiple task sequences including long tail task sequences on a limited number of worker nodes of a stream processing system.

FIG. 6 shows one implementation of a flowchart 600 of handling multiple task sequences including long tail task sequences on a limited number of worker nodes of a stream processing system. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this workflow is described with reference to the system that carries out a method. The system is not necessarily part of the method.

At action 610, the method includes defining containers over worker nodes that have physical threads, with one physical thread utilizing a whole processor core of a worker node, as described supra.

At action 620, the method includes, for multiple task sequences, queuing data from incoming near real-time (NRT) data streams in pipelines that run in the containers, as described supra.

At action 630, the method includes, processing data from the NRT data streams as batches using a container-coordinator that controls dispatch of the batches, as described supra.

At action 640, the method includes dispatching the batches to the physical threads, where a batch runs to completion or to a time out, as described supra. The method also includes during execution, comparing a count of available physical threads against a set number of logically parallel threads. The method further includes, when a count of available physical threads equals or exceeds the number of logically parallel threads, concurrently processing the batches at the physical threads, and when there are fewer available physical threads than the number of logically parallel threads, multiplexing the batches sequentially over the available physical threads.

The some implementations, the disclosed method further includes concurrently processing at least one subset of the batches in the pipeline with at least another subset of the batches in the pipeline and multiplexing at least some of the batches in the subsets sequentially. The number of logically parallel threads is 10 and the count of available physical threads is 10 in some implementations, and the method can further include concurrently processing the batches in the pipeline at the 10 available physical threads. In other implementations, the number of logically parallel threads is 10 and the count of available physical threads is 9. The disclosed method can further include concurrently processing the batches in the pipeline at 8 of the 9 available physical threads and multiplexing some of the batches in the pipeline sequentially over at least 1 available physical thread.

In another implementation, the number of logically parallel threads is 10 and the count of available physical threads is 1, and includes multiplexing the batches in the pipeline sequentially over the 1 available physical thread. The multiplexing can include processing a batch in a pipeline till completion or time out before processing a next batch in the pipeline.

In some implementations the disclosed method can further include concurrently processing a plurality of pipelines over multiple worker nodes in a container.

A batch is defined on a time-slice basis and includes a portion of at least one incoming NRT data stream most recently received within a time window, for some implementations. In others, a batch is defined on a batch-size basis and includes a data size constrained portion of at least one incoming NRT data stream received most recently.

Multi-Tenant Integration

Figure 7:
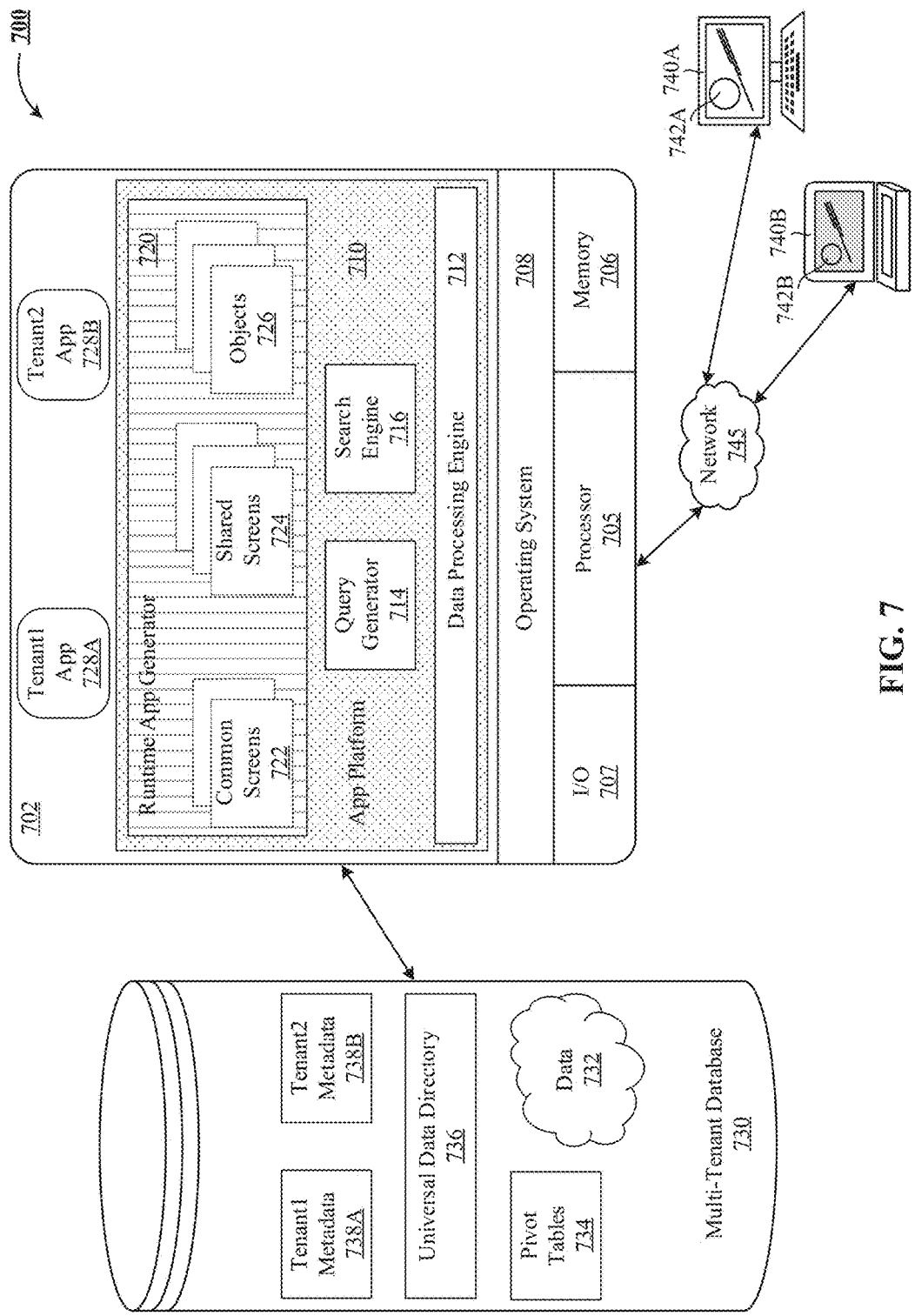
FIG. 7 is a block diagram of an exemplary multi-tenant system suitable for integration with the IoT platform of FIG. 1 in accordance with one or more implementations of the technology disclosed.

FIG. 7 is a block diagram of an exemplary multi-tenant system 700 suitable for integration with in the IoT platform 100 of FIG. 1 in accordance with one or more implementation.

IoT platform 100 of FIG. 1 can be implemented using a multi-tenant system. In that regard, FIG. 7 presents a conceptual block diagram of an exemplary multi-tenant system suitable for integration with the IoT platform 100 of FIG. 1 in accordance with one or more implementations.

In general, the illustrated multi-tenant system 700 of FIG. 7 includes a server 702 that dynamically creates and supports virtual applications 728A and 728B based upon data 732 from a common database 730 that is shared between multiple tenants, alternatively referred to herein as a "multitenant database". Data and services generated by the virtual applications 728A and 728B are provided via a network 745 to any number of client devices 740A or 740B, as desired. Virtual applications 728A and 728B are suitably generated at run-time (or on-demand) using application platform 710 that securely provides access to the data 732 in the database 730 for each of the various tenants subscribing to the multi-tenant system 700. In accordance with one non-limiting example, the multi-tenant system 700 is implemented in the form of an on-demand multi-tenant user relationship management (CRM) system that can support any number of authenticated users of multiple tenants.

As used herein, a "tenant" or an "organization" refers to a group of one or more users that shares access to common subset of the data within the multi-tenant database 730. In this regard, each tenant includes one or more users associated with, assigned to, or otherwise belonging to that respective tenant. Stated another way, each respective user within the multi-tenant system 700 is associated with, assigned to, or otherwise belongs to a particular tenant of the plurality of tenants supported by the multi-tenant system 700. Tenants may represent users, user departments, work or legal organizations, and/or any other entities that maintain data for particular sets of users within the multi-tenant system 700. Although multiple tenants may share access to the server 702 and the database 730, the particular data and services provided from the server 702 to each tenant can be securely isolated from those provided to other tenants. The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various implementations, the database 730 shares processing hardware with the server 702. In other implementations, the database 730 is implemented using separate physical and/or virtual database server hardware that communicates with the server 702 to perform the various functions described herein. In an exemplary implementation, the database 730 includes a database management system or other equivalent software capable of determining an optimal query plan for retrieving and providing a particular subset of the data 732 to an instance of virtual application 728A or 728B in response to a query initiated or otherwise provided by a virtual application 728A or 728B. The multi-tenant database 730 may alternatively be referred to herein as an on-demand database, in that the multi-tenant database 730 provides (or is available to provide) data at run-time to on-demand virtual applications 728A or 728B generated by the application platform 710.

In practice, the data 732 may be organized and formatted in any manner to support the application platform 710. In various implementations, the data 732 is suitably organized into a relatively small number of large data tables to maintain a semi-amorphous "heap"-type format. The data 732 can then be organized as needed for a particular virtual application 728A or 728B. In various implementations, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, work logic and other constructs that are common to multiple tenants. Tenant-specific formatting, functions and other constructs may be maintained as tenant-specific metadata 738A and 738B for each tenant, as desired. Rather than forcing the data 732 into an inflexible global structure that is common to all tenants and applications, the database 730 is organized to be relatively amorphous, with the pivot tables 734 and the metadata 738A and 738B providing additional structure on an as-needed basis. To that end, the application platform 710 suitably uses the pivot tables 734 and/or the metadata 738A-B to generate "virtual" components of the virtual applications 728A and 728B to logically obtain, process, and present the relatively amorphous data 732 from the database 730.

The server 702 is implemented using one or more actual and/or virtual computing systems that collectively provide the dynamic application platform 710 for generating the virtual applications 728A and 728B. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728A and 728B, and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728A and 728B that provide data and/or services to the client devices 740A and 740B. In a typical implementation, the application platform 710 gains access to processing resources, communications interfaces and other features of the processing hardware using any sort of conventional or proprietary operating system 708. The virtual applications 728A and 728B are typically generated at run-time in response to input received from the client devices 740A and 740B. For the illustrated implementation, the application platform 710 includes a bulk data processing engine 712, a query generator 714, a search engine 716 that provides text indexing and other search functionality, and a runtime application generator 720. Each of these features may be implemented as a separate process or other module, and many equivalent implementations could include different and/or additional features, components or other modules as desired.

The runtime application generator 720 dynamically builds and executes the virtual applications 728A and 728B in response to specific requests received from the client devices 740A and 740B. The virtual applications 728A and 728B are typically constructed in accordance with the tenant-specific metadata 738A and 738B, which describes the particular tables, reports, interfaces and/or other features of the particular application 728A or 728B. In various implementations, each virtual application 728A or 728B generates dynamic web content that can be served to a browser or other client programs 742A and 742B associated with its client device 740A or 740B, as appropriate.

The runtime application generator 720 suitably interacts with the query generator 714 to efficiently obtain multi-tenant data 732 from the database 730 as needed in response to input queries initiated or otherwise provided by users of the client devices 740A and 740B. In a typical implementation, the query generator 714 considers the identity of the user requesting a particular function (along with the user's associated tenant), and then builds and executes queries to the database 730 using system-wide metadata within a universal data directory (UDD) 736, tenant specific metadata 738A and 738B, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728A or 728B for that user and/or tenant.

Still referring to FIG. 7, the data processing engine 712 performs bulk processing operations on the data 732 such as uploads or downloads, updates, online transaction processing, and/or the like. In many implementations, less urgent bulk processing of the data 732 can be scheduled to occur as processing resources become available, thereby giving priority to more urgent data processing by the query generator 714, the search engine 716, the virtual applications 728A and 728B, etc.

In exemplary implementations, the application platform 710 is utilized to create and/or generate data-driven virtual applications 728A and 728B for the tenants that they support. Such virtual applications 728A and 728B may make use of interface features such as custom (or tenant-specific) screens 724, standard (or universal) screens 722 or the like. Any number of custom and/or standard objects 726 may also be available for integration into tenant-developed virtual applications 728A and 728B. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 732 associated with each virtual application 728A or 728B is provided to the database 730, as appropriate, and stored until it is requested or is otherwise needed, along with the metadata 738A and 738B that describes the particular features (e.g., reports, tables, functions, objects, fields, formulas, code, etc.) of that particular virtual application 728A or 728B. For example, a virtual application 728A or 728B may include a number of objects 726 accessible to a tenant, wherein for each object 726 accessible to the tenant, information pertaining to its object type along with values for various fields associated with that respective object type are maintained as metadata 738A and 738B in the database 730. In this regard, the object type defines the structure (e.g., the formatting, functions and other constructs) of each respective object 726 and the various fields associated therewith.

With continued reference to FIG. 7, the data and services provided by the server 702 can be retrieved using any sort of personal computer, mobile telephone, tablet or other network-enabled client device 740A or 740B on the network 745. In an exemplary implementation, the client device 740A or 740B includes a display device, such as a monitor, screen, or another conventional electronic display capable of graphically presenting data and/or information retrieved from the multi-tenant database 730. Typically, the user operates a conventional browser application or other client program 742A or 742B executed by the client devices 740A and 740B to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728A or 728B, the runtime application generator 720 suitably creates the application at run time based upon the metadata 738A and 738B, as appropriate. As noted above, the virtual application 728A or 728B may contain Java, ActiveX, or other content that can be presented using conventional client software running on the client device 740A or 740B; other implementations may simply provide dynamic web or other content that can be presented and viewed by the user, as desired.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

For the sake of brevity, conventional techniques related to databases, social networks, user interfaces, and other functional aspects of the systems (and the individual operating components of the systems) may not be described in detail herein. In addition, those skilled in the art will appreciate that implementations may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Implementations of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary implementations, the subject matter described herein is implemented in conjunction with a virtual user relationship management (CRM) application in a multi-tenant environment.

Some Particular Implementations

Some particular implementations and features are described in the following discussion.

The technology disclosed monitors performance of the IoT platform 100 and its components, and also maintains application metrics for the IoT platform 100. In one implementation, the technology disclosed calculates throughput and latency of a container and/or a topology. In another implementation, the technology disclosed calculates tuples per minute, capacity, throughput, latency, queuing time, read and write rates and execution time for each spout and bolt within a container and/or a topology. In yet another implementation, the technology disclosed calculates an offset between an input queue (e.g. Kafka spout) and an output queue (e.g. Kafka sink) of a container, and determines a latency and/or a drop in throughput within the container.

In some implementations, one or more monitoring tools are used to detect latency and throughput variations within a container. Some examples of such monitoring tools include data collectors like Storm UI, JMX (Java management extensions), VisualVM, Yammer metrics, Statsd, Graphite, Log4j, Ganglia and Nagios. In one implementation, tuple trackers are used to track the tuples emitted, acked and failed at different spouts and bolts within a topology. Tuple trackers are libraries of programming code written in a programming language like Java or JSON that are attached to individual topology components to provide periodic updates on the processing of tuples at the respective components.

In one implementation, an offset monitor is used that monitors Kafka queue consumers and their current offset. This offset monitor identifies the current consumer groups, the topics being consumed within each consumer group and the offsets of the consumer groups in each Kafka queue. This information is used to calculate the rate at which tuples are consumed by the input queue.

In yet another implementation, certain application metrics for a Kafka input queue are monitored. In one example, offset commit rate of Kafka consumers to a service registry like ZooKeeper is tracked to determine a tuple consumption rate. In another example, the offset cache size of Kafka brokers is tracked to determine the tuple consumption rate. In a further implementation, when a Kafka spout commits an offset to a ZooKeeper, the latest offset from the Kafka broker is read and compared with the offset at the ZooKeeper. This comparison yields a delta that is used to calculate the tuple consumption rate of the container. In one other implementation, various application metrics are determined for a Kafka spout, including spout lag, latest time offset, latest emitted offset and earliest time offset, and used to determine the tuple consumption rate.

Further, a long tail task sequence is detected when the tuple consumption rate at an input queue drops below a preset consumption rate, according to one implementation. In another implementation, a long tail task sequence is detected when the emission rate at a Kafka spout drops below a preset emission rate. In yet other implementations, different monitoring tools and application metrics described supra can be used to detect a long tail task sequence.

Further, a surging task sequence is detected when the tuple consumption rate at an input queue exceeds a preset consumption rate, according to one implementation. In another implementation, a surging task sequence is detected when the emission rate at a Kafka spout exceeds a preset emission rate. In yet other implementations, different monitoring tools and application metrics described supra can be used to detect a surging task sequence.

In one implementation, a method of handling multiple task sequences including long tail task sequences on a limited number of worker nodes of a stream processing system includes defining containers over worker nodes that have physical threads, with one physical thread utilizing a whole processor core of a worker node. The method also includes, for multiple task sequences, queuing data from incoming near real-time (NRT) data streams in pipelines that run in the containers, processing data from the NRT data streams as batches using a container-coordinator that controls dispatch of the batches, and dispatching the batches to the physical threads, where a batch runs to completion or to a time out, including during execution, comparing a count of available physical threads against a set number of logically parallel threads. The method further includes, when a count of available physical threads equals or exceeds the number of logically parallel threads, concurrently processing the batches at the physical threads, and when there are fewer available physical threads than the number of logically parallel threads, multiplexing the batches sequentially over the available physical threads.

The some implementations, the disclosed method further includes concurrently processing at least one subset of the batches in the pipeline with at least another subset of the batches in the pipeline and multiplexing at least some of the batches in the subsets sequentially. The number of logically parallel threads is 10 and the count of available physical threads is 10 in some implementations, and the method can further include concurrently processing the batches in the pipeline at the 10 available physical threads. In other implementations, the number of logically parallel threads is 10 and the count of available physical threads is 9. The disclosed method can further include concurrently processing the batches in the pipeline at 8 of the 9 available physical threads and multiplexing some of the batches in the pipeline sequentially over at least 1 available physical thread.

In another implementation, the number of logically parallel threads is 10 and the count of available physical threads is 1, and includes multiplexing the batches in the pipeline sequentially over the 1 available physical thread. The multiplexing can include processing a batch in a pipeline till completion or time out before processing a next batch in the pipeline.

In some implementations the disclosed method can further include concurrently processing a plurality of pipelines over multiple worker nodes in a container, including when there are fewer available physical threads than the number of logically parallel threads, multiplexing the pipelines sequentially over the available physical threads.

A batch is defined on a time-slice basis and includes a portion of at least one incoming NRT data stream most recently received within a time window, for some implementations. In other implementations, a batch is defined on a batch-size basis and includes a data size constrained portion of at least one incoming NRT data stream received most recently.

The implementations and features described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, introduction, IoT platform and stream-batch processing framework, state machine, data columnar, flowcharts, multi-tenant integration, some particular implementations, etc.

Other implementations of the method described in this section can include a non-transitory computer readable storage medium storing computer program instructions executable by a processor to perform any of the methods described above. Yet another implementation of the method described in this section can include a system including one or more processors coupled to memory, the memory loaded with computer instructions, operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of handling multiple task sequences, including long tail task sequences, the method comprising:
    defining a container over worker nodes having up to one physical thread per processor core of a worker node;
    for multiple task sequences, queuing data from a plurality of incoming near real-time (NRT) data streams in at least one pipeline running in the container;
    determining, based on analysis of a given NRT data stream for processing by at least one task sequence of the multiple task sequences, that a data volume for the at least one task sequence is expected to decrease after a surge in the data volume;
    processing data from the plurality of NRT data streams in a plurality of batches via a container-coordinator configured to control batch dispatching;
    dispatching the plurality of batches to physical threads of the worker nodes for processing, wherein the dispatching comprises:
    during execution, comparing a count of physical threads available for batch processing against a set number of logically parallel threads available for batch dispatching;
    when a count of the physical threads available for batch processing equals or exceeds the number of logically parallel threads available for batch dispatching, concurrently processing the plurality of batches at the physical threads; and when the count of physical threads available for batch processing is less than the number of logically parallel threads available for batch dispatching, multiplexing the plurality of batches sequentially over at least one of the physical threads available for batch processing, including processing a batch of the plurality of batches in the at least one pipeline till completion or time out before processing a next batch of the plurality of batches in the at least one pipeline; and assigning, via a scheduler, a priority level to at least a first pipeline and a second pipeline, wherein execution of a first number of batches of the plurality of batches in the first pipeline is performed before execution of a second number of batches of the plurality of batches in the second pipeline, according to the priority level.

2. The method of claim 1, further including concurrently processing at least one subset of the plurality of batches in the at least one pipeline with at least another subset of the plurality of batches in the at least one pipeline and multiplexing at least one batch in the subsets sequentially.

3. The method of claim 1, further including concurrently processing a plurality of pipelines over multiple worker nodes in a given container, including:

when there are fewer physical threads available for batch processing than the number of logically parallel threads available for batch dispatching, multiplexing the plurality of pipelines sequentially over the available physical threads.

4. The method of claim 1, wherein at least one batch is defined on a time-slice basis and includes a portion of at least one incoming NRT data stream most recently received within a time window.

5. The method of claim 1, wherein at least one batch is defined on a batch-size basis.

6. The method of claim 1, wherein the at least one pipeline comprises a plurality of grouped event tuples from a portion of at least one incoming NRT data stream.

7. A system for handling multiple task sequences including long-tail task sequences, the system including one or more processors coupled to memory and configured to perform operations comprising:

defining a container over worker nodes having up to one physical thread per processor core of a worker node;

for multiple task sequences, queuing data from a plurality of incoming near real-time (NRT) data streams in at least one pipeline running in the container;

determining, based on analysis of a given NRT data stream for processing by at least one task sequence of the multiple task sequences, that a data volume for the at least one task sequence is expected to decrease after a surge in the data volume;

processing data from the plurality of NRT data streams in a plurality of batches via a container-coordinator configured to control batch dispatching;

dispatching the plurality of batches to physical threads of the worker nodes for processing, wherein the dispatching comprises:

during execution, comparing a count of physical threads available for batch processing against a set number of logically parallel threads available for batch dispatching;

when a count of the physical threads available for batch processing equals or exceeds the number of logically parallel threads available for batch dispatching, concurrently processing the plurality of batches at the physical threads; and when the count of physical threads available for batch processing is less than the number of logically parallel threads available for batch dispatching, multiplexing the plurality of batches sequentially over at least one of the physical threads available for batch processing, including processing a batch of the plurality of batches in the at least one pipeline till completion or time out before processing a next batch of the plurality of batches in the at least one pipeline; and assigning, via a scheduler, a priority level to at least a first pipeline and a second pipeline, wherein execution of a first number of batches of the plurality of batches in the first pipeline is performed before execution of a second number of batches of the plurality of batches in the second pipeline, according to the priority level.

8. The system of claim 7, configured to perform operations comprising concurrently processing at least one subset of the plurality of batches in the at least one pipeline with at least another subset of the plurality of batches in the at least one pipeline and multiplexing at least one batch in the subsets sequentially.

9. The system of claim 7, further configured to perform operations comprising concurrently processing a plurality of pipelines over multiple worker nodes in a given container, including:

when there are fewer available physical threads than the number of logically parallel threads, multiplexing the plurality of pipelines sequentially over the available physical threads.

10. The system of claim 7, wherein at least one batch is defined on a time-slice basis and includes a portion of at least one incoming NRT data stream most recently received within a time window.

11. The system of claim 7, wherein at least one batch is defined on a batch-size basis.

12. The system of claim 7, wherein the at least one pipeline comprises a plurality of grouped event tuples from a portion of at least one incoming NRT data stream.

13. A non-transitory computer-readable storage medium with computer program instructions stored thereon for handling multiple task sequences including long-tail task sequences, wherein the instructions, when executed by at least one processor, cause the at least one processor to perform operations comprising:

defining a container over worker nodes having up to one physical thread per processor core of a worker node;

for multiple task sequences, queuing data from a plurality of incoming near real-time (NRT) data streams in at least one pipeline running in the container;

determining, based on analysis of a given NRT data stream for processing by at least one task sequence of the multiple task sequences, that a data volume for the at least one task sequence is expected to decrease after a surge in the data volume;

processing data from the plurality of NRT data streams in a plurality of batches via a container-coordinator configured to control batch dispatching;

dispatching the plurality of batches to physical threads of the worker nodes for processing, wherein the dispatching comprises:

during execution, comparing a count of physical threads available for batch processing against a set number of logically parallel threads available for batch dispatching;

when a count of the physical threads available for batch processing equals or exceeds the number of logically parallel threads available for batch dispatching, concurrently processing the plurality of batches at the physical threads; and when the count of physical threads available for batch processing is less than the number of logically parallel threads available for batch dispatching, multiplexing the plurality of batches sequentially over at least one of the physical threads available for batch processing, including processing a batch of the plurality of batches in the at least one pipeline till completion or time out before processing a next batch of the plurality of batches in the at least one pipeline; and assigning, via a scheduler, a priority level to at least a first pipeline and a second pipeline, wherein execution of a first number of batches of the plurality of batches in the first pipeline is performed before execution of a second number of batches of the plurality of batches in the second pipeline, according to the priority level.

14. The non-transitory computer-readable storage medium of claim 13, the operations further comprising concurrently processing at least one subset of the plurality of batches in the at least one pipeline with at least another subset of the plurality of batches in the at least one pipeline and multiplexing at least one batch in the subsets sequentially.

15. The non-transitory computer-readable storage medium of claim 13, the operations further comprising concurrently processing a plurality of pipelines over multiple worker nodes in a given container, including:
when there are fewer available physical threads than the number of logically parallel threads, multiplexing the plurality of pipelines sequentially over the available physical threads.

16. The non-transitory computer-readable storage medium of claim 13, wherein at least one batch is defined on a time-slice basis and includes a portion of at least one incoming NRT data stream most recently received within a time window.

17. The non-transitory computer-readable storage medium of claim 13, wherein at least one batch is defined on a batch-size basis.

* * * * *